(12) United States Patent
Fuji

(10) Patent No.: US 12,479,677 B2
(45) Date of Patent: Nov. 25, 2025

(54) MEDIUM SUPPORT DEVICE AND READING DEVICE

(71) Applicant: SEIKO EPSON CORPORATION, Tokyo (JP)

(72) Inventor: Keita Fuji, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 143 days.

(21) Appl. No.: 18/470,239

(22) Filed: Sep. 19, 2023

(65) Prior Publication Data
US 2024/0092593 A1 Mar. 21, 2024

(30) Foreign Application Priority Data
Sep. 20, 2022 (JP) .................................. 2022-148840

(51) Int. Cl.
*B65H 1/04* (2006.01)
*B65H 1/02* (2006.01)
*B65H 31/20* (2006.01)
*H04N 1/00* (2006.01)

(52) U.S. Cl.
CPC ............... *B65H 1/02* (2013.01); *B65H 31/20* (2013.01); *H04N 1/00588* (2013.01); *H04N 1/00795* (2013.01); *B65H 2403/40* (2013.01); *B65H 2404/691* (2013.01); *B65H 2405/11164* (2013.01); *B65H 2405/21* (2013.01); *B65H 2511/11* (2013.01); *B65H 2601/523* (2013.01)

(58) Field of Classification Search
CPC ........ B65H 1/04; B65H 1/02; B65H 2511/11; B65H 2404/691; B65H 2405/11164; B65H 2405/1116; B65H 2405/321; B65H 2405/3211; B65H 2405/324; B65H 31/20; B65H 2601/523
See application file for complete search history.

(56) References Cited

U.S. PATENT DOCUMENTS

| 9,051,139 | B2 * | 6/2015 | Wang ..................... B65H 31/20 |
| 2017/0283195 | A1 * | 10/2017 | Ikegami ................... B65H 1/04 |
| 2019/0174012 | A1 * | 6/2019 | Uchida .............. H04N 1/00591 |
| 2022/0281246 | A1 * | 9/2022 | Lin ........................ B41J 13/103 |

FOREIGN PATENT DOCUMENTS

| JP | 09175661 A | * | 7/1997 |
| JP | 2000-344354 A | | 12/2000 |
| JP | 2008007232 A | * | 1/2008 |
| JP | 2014196166 A | * | 10/2014 |
| JP | 2023-050619 A | | 4/2023 |

* cited by examiner

*Primary Examiner* — Luis A Gonzalez
(74) *Attorney, Agent, or Firm* — WORKMAN NYDEGGER

(57) ABSTRACT

A second right-side extension portion entirely overlaps with a first right-side extension portion in a stored state when viewed in a depth direction, and a second left-side extension portion entirely overlaps a first left-side extension portion in a stored state when viewed in the depth direction. Moreover, a right-side gear is provided so as to be located between a right-side first end portion and a right-side second end portion of the first right-side extension portion, and a left-side gear is provided so as to be located between a left-side first end portion and a left-side second end portion of the first left-side extension portion.

18 Claims, 12 Drawing Sheets

MEDIUM SUPPORT DEVICE AND READING DEVICE

The present application is based on, and claims priority from JP Application Serial Number 2022-148840, filed Sep. 20, 2022, the disclosure of which is hereby incorporated by reference herein in its entirety.

BACKGROUND

1. Technical Field

The present disclosure relates to a medium support device and a reading device.

2. Related Art

As an example of this kind of device, there is a device described in JP-A-2000-344354. In JP-A-2000-344354, a sheet material loading device including a paper feeding auxiliary arm that is pivotally attached to an upper portion of a paper feeder main body and pivots using a pivot shaft in a lower portion as a pivot fulcrum, and an extension auxiliary arm that slides from the paper feeding auxiliary arm to be contracted and extended is disclosed (the fourth and fifth embodiments). The sheet material loading device is an example of the medium support device.

In the medium support device, a reading device including the medium support device, and the like, there is a demand for size reduction. In the above-described related art, there is room for improvement in terms of size reduction of the auxiliary arms.

SUMMARY

In order to solve the above-described problem, the present disclosure is a medium support device including a medium support portion that has a medium support surface on which a medium is supported such that the medium is configured to be transported in a transport direction, and an extension support portion that is provided in the medium support portion, in which the extension support portion has a first extension portion that is configured to be displaced between a stored state in which the first extension portion is stored in the medium support portion and an extended state in which the first extension portion is rotated with respect to the medium support portion to be extended and supports the medium together with the medium support portion, and a second extension portion that is configured to be displaced between a stored state in which the second extension portion is stored in the first extension portion and an extended state in which the second extension portion is slid from the first extension portion in a first direction to be extended and supports the medium together with the first extension portion, the first extension portion has a first right-side extension portion that is located further on a right side than a center position of the medium support portion, and a first left-side extension portion that is located further on a left side than the center position when viewed from a front side in a depth direction intersecting the transport direction, a right-side gear that is located at a base end of the first right-side extension portion and forms a right-side rotation fulcrum of the first right-side extension portion, and a left-side gear that is located at a base end of the first left-side extension portion, forms a left-side rotation fulcrum of the first left-side extension portion, and is engaged with the right-side gear, the first right-side extension portion includes, in a second direction intersecting the first direction, a right-side first end portion and a right-side second end portion facing the right-side first end portion, the first left-side extension portion includes, in the second direction, a left-side first end portion and a left-side second end portion facing the left-side first end portion, the right-side gear is provided to be located between the right-side first end portion and the right-side second end portion of the first right-side extension portion, the left-side gear is provided to be located between the left-side first end portion and the left-side second end portion of the first left-side extension portion, the second extension portion has a second right-side extension portion that is stored in the first right-side extension portion and a second left-side extension portion that is stored in the first left-side extension portion, the second right-side extension portion entirely overlaps with the first right-side extension portion in the stored state when viewed in the depth direction, and the second left-side extension portion entirely overlaps with the first left-side extension portion when viewed in the depth direction in the stored state.

In addition, the present disclosure is a reading device including a reading unit that reads an image of a medium, and a medium support device including a medium support portion that has a medium support surface on which the medium is supported such that the medium is configured to be transported in a transport direction toward the reading unit, and an extension support portion that is provided in the medium support portion, in which the medium support device is the medium support device according to any one of the first to the 15th aspects described later or the medium support device according to the 16th aspect.

DESCRIPTION OF EMBODIMENTS

Figure 1:
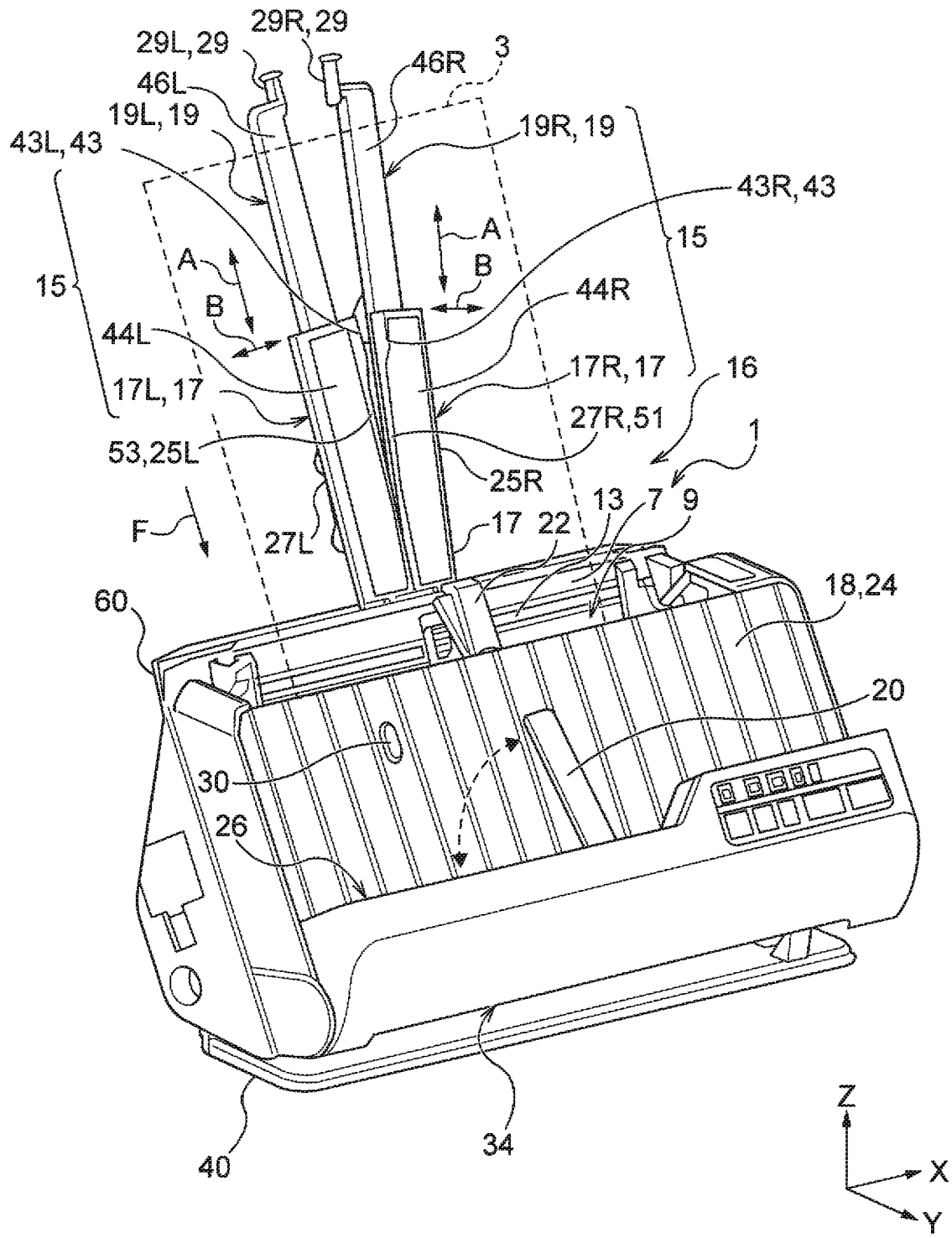
FIG. 1 is a perspective view of a reading device according to a first embodiment in which an extension support portion is in an extended state.

Hereinafter, the present disclosure will be schematically described first. In order to solve the above-described problem, according to a first aspect of the present disclosure, there is provided a medium support device including a medium support portion that has a medium support surface on which a medium is supported such that the medium is configured to be transported in a transport direction, and an extension support portion that is provided in the medium support portion, in which the extension support portion has a first extension portion that is configured to be displaced between a stored state in which the first extension portion is stored in the medium support portion and an extended state in which the first extension portion is rotated with respect to the medium support portion to be extended and supports the medium together with the medium support portion, and a second extension portion that is configured to be displaced between a stored state in which the second extension portion is stored in the first extension portion and an extended state in which the second extension portion is slid from the first extension portion in a first direction to be extended and supports the medium together with the first extension portion, the first extension portion has a first right-side extension portion that is located further on a right side than a center position of the medium support portion, and a first left-side extension portion that is located further on a left side than the center position when viewed from a front side in a depth direction intersecting the transport direction, a right-side gear that is located at a base end of the first right-side extension portion and forms a right-side rotation fulcrum of the first right-side extension portion, and a left-side gear that is located at a base end of the first left-side extension portion, forms a left-side rotation fulcrum of the first left-side extension portion, and is engaged with the right-side gear, the first right-side extension portion includes, in a second direction intersecting the first direction, a right-side first end portion and a right-side second end portion facing the right-side first end portion, the first left-side extension portion includes, in the second direction, a left-side first end portion and a left-side second end portion facing the left-side first end portion, the right-side gear is provided to be located between the right-side first end portion and the right-side second end portion of the first right-side extension portion, the left-side gear is provided to be located between the left-side first end portion and the left-side second end portion of the first left-side extension portion, the second extension portion has a second right-side extension portion that is stored in the first right-side extension portion and a second left-side extension portion that is stored in the first left-side extension portion, the second right-side extension portion entirely overlaps with the first right-side extension portion in the stored state when viewed in the depth direction, and the second left-side extension portion entirely overlaps with the first left-side extension portion when viewed in the depth direction in the stored state.

Here, the term "extended state" of "a second extension portion that is configured to be displaced between a stored state in which the second extension portion is stored in the first extension portion and an extended state in which the second extension portion is slid from the first extension portion in a first direction to be extended and supports the medium together with the first extension portion" means a state in which the second extension portion departs from the stored state in which the second extension portion is stored in the first extension portion and supports the medium together with the first extension portion. In addition, the term "center position" of "than a center position of the medium support portion" is not limited to a center position in the strict meaning, when viewed from a front side in a depth direction intersecting the transport direction, and is used having a meaning including a range in which the position deviates from the center position within a range in which the medium can be supported substantially without any problem when the first extension portion supports the medium together with the medium support portion. In addition, the phrase "is engaged with" of "a left-side gear that is located at a base end of the first left-side extension portion, forms a left-side rotation fulcrum of the first left-side extension portion, and is engaged with the right-side gear" has a meaning including both of a case in which the right-side gear is directly engaged with the left-side gear and a case in which the right-side gear is indirectly engaged with the left-side gear with another gear interposed therebetween. In addition, the term "second direction" of "the first right-side extension portion includes, in a second direction intersecting the first direction," is not a thickness direction but a width direction of the first extension portion when a longitudinal direction of the first extension portion is the first direction. In addition, the phrase "located between" of "located between the right-side first end portion and the right-side second end portion" means being located between a straight line made by the right-side first end portion and a straight line made by the right-side second end portion. The phrase "located between" of "located between the left-side first end portion and the left-side second end portion of the first left-side extension portion" means being located between a straight line made by the left-side first end portion and a straight line made by the left-side second end portion. In addition, the phrase "entirely overlaps" means that the contour of the second extension portion viewed in the depth direction exists inside the contour of the first extension portion viewed in the depth direction.

According to the aspect, the second right-side extension portion entirely overlaps with the first right-side extension portion in the stored state when viewed in the depth direction, and the second left-side extension portion entirely overlaps with the first left-side extension portion when viewed in the depth direction in the stored state. Moreover, the right-side gear is provided so as to be located between the right-side first end portion and the right-side second end portion of the first right-side extension portion, and the left-side gear is provided so as to be located between the left-side first end portion and the left-side second end portion of the first left-side extension portion. As a result, in the stored state of the second extension portion, an area occupied by the first extension portion and the second extension portion in the second direction, that is, the transport direction of the medium can be reduced in size.

A second aspect of the present disclosure provides the medium support device according to the first aspect in which the first extension portion entirely overlaps with the medium support portion when viewed in the depth direction in the stored state. Here, the phrase "entirely overlaps" means that the contour of the first extension portion viewed in the depth direction exists inside the contour of the medium support portion viewed in the depth direction.

According to the aspect, the first extension portion entirely overlaps with the medium support portion in the stored state of the first extension portion when viewed in the depth direction. As a result, in the stored state of the first extension portion, an area occupied by the medium support portion, the first extension portion, and the second extension portion in the second direction, that is, the transport direction of the medium can be reduced in size.

A third aspect of the present disclosure provides the medium support device according to the first aspect in which the first right-side extension portion has a right-side engagement portion, at the base end, provided with a right-side projection, the first left-side extension portion has a left-side engagement portion, at the base end, provided with a left-side projection, the medium support portion has a right-side contact portion that comes into contact with the right-side projection and a left-side contact portion that comes into contact with the left-side projection, the right-side contact portion has a first right-side engaged portion that is engaged with the right-side projection when the first right-side extension portion is in the stored state, and a second right-side engaged portion that is engaged with the right-side projection when the first right-side extension portion is in the extended state, and the left-side contact portion has a first left-side engaged portion that is engaged with the left-side projection when the first left-side extension portion is in the stored state, and a second left-side engaged portion that is engaged with the left-side projection when the first left-side extension portion is in the extended state.

According to the aspect, the first right-side extension portion has the right-side engagement portion provided with the right-side projection, and the first left-side extension portion has the left-side engagement portion provided with the left-side projection. Moreover, the medium support portion has the right-side contact portion and the left-side contact portion, the right-side contact portion has the first right-side engaged portion that is engaged with the right-side projection when the first right-side extension portion is in the stored state, and the second right-side engaged portion that is engaged with the right-side projection in the extended state, and the left-side contact portion has the first left-side engaged portion that is engaged with the left-side projection when the first left-side extension portion is in the stored state, and the second left-side engaged portion that is engaged with the left-side projection in the extended state. As a result, the stored state and the extended state of the first extension portion can be retained by the respective engagements.

A fourth aspect of the present disclosure provides the medium support device according to the third aspect in which the right-side engagement portion is located between the right-side first end portion and the right-side second end portion of the first right-side extension portion, and the left-side engagement portion is located between the left-side first end portion and the left-side second end portion of the first left-side extension portion. Here, the phrase "located between" of "located between the right-side first end portion and the right-side second end portion" means being located between a straight line made by the right-side first end portion and a straight line made by the right-side second end portion. The phrase "located between" of "located between the left-side first end portion and the left-side second end portion of the first left-side extension portion" means being located between a straight line made by the left-side first end portion and a straight line made by the left-side second end portion.

According to the aspect, the right-side engagement portion is located between the right-side first end portion and the right-side second end portion of the first right-side extension portion, and the left-side engagement portion is located between the left-side first end portion and the left-side second end portion of the first left-side extension portion. As a result, the reduction in size including an area occupied by the right-side engagement portion and the left-side engagement portion the left-side engagement portion can be realized.

A fifth aspect of the present disclosure provides the medium support device according to the third aspect in which the right-side engagement portion is a right-side elastic deformation portion that is configured to be elastically deformed, the left-side engagement portion is a left-side elastic deformation portion that is configured to be elastically deformed, the right-side contact portion has a right-side wall portion, the right-side elastic deformation portion is elastically deformed toward the rotation fulcrum of the first right-side extension portion when the right-side projection comes into contact with the right-side wall portion and moves to be engaged with the first right-side engaged portion or the second right-side engaged portion, the left-side contact portion has a left-side wall portion, and the left-side elastic deformation portion is elastically deformed toward the rotation fulcrum of the first left-side extension portion when the left-side projection comes into contact with the left-side wall portion and moves to be engaged with the first left-side engaged portion or the second left-side engaged portion.

According to the aspect, when the right-side projection comes into contact with the right-side wall portion and moves so as to be engaged with the first right-side engaged portion or the second right-side engaged portion, the right-side elastic deformation portion is elastically deformed toward the rotation fulcrum of the first right-side extension portion. Moreover, when the left-side projection comes into contact with the left-side wall portion and moves so as to be engaged with the first left-side engaged portion or the second left-side engaged portion, the left-side elastic deformation portion is elastically deformed toward the rotation fulcrum of the first left-side extension portion. That is, when the first extension portion is rotated with respect to the medium support portion, the respective projections come into contact with the respective wall portions and move so as to be engaged with the respective engaged portions, and the respective elastic deformation portions are elastically deformed toward the respective rotation fulcrums. As a result, when the first extension portion is rotated and displaced between the position in the stored state and the position in the extended state, a load is gradually applied to the rotation of the first extension portion through the wall portions, and thus the operability of the user can be improved.

A sixth aspect of the present disclosure provides the medium support device according to the first aspect in which the second extension portion is configured to be displaced, interlocking with rotation and displacement of the first extension portion.

According to the aspect, the second extension portion can be displaced, interlocking with the rotation and displacement of the first extension portion. As a result, when the first extension portion is rotated, the second extension portion is interlocked and is also displaced with respect to the first extension portion, and thus the operability of the user can be improved.

An seventh aspect of the present disclosure provides the medium support device according to the sixth aspect further including a first link mechanism that couples the first right-side extension portion to the second left-side extension portion, and a second link mechanism that couples the first left-side extension portion to the second right-side extension portion, in which the interlocking is performed by the first link mechanism and the second link mechanism.

According to the aspect, the interlocking is performed by the first link mechanism and the second link mechanism. As a result, the interlocking can be realized by making the structure simple.

A eighth aspect of the present disclosure provides the medium support device according to the seventh aspect, in which the first link mechanism and the second link mechanism are located between the right-side first end portion and the right-side second end portion of the first right-side extension portion, and are located between the left-side first end portion and the left-side second end portion of the first left-side extension portion when the first extension portion is in the stored state. Here, the phrase "located between" of "located between the right-side first end portion and the right-side second end portion" means being located between a straight line made by the right-side first end portion and a straight line made by the right-side second end portion. The phrase "located between" of "located between the left-side first end portion and the left-side second end portion of the first left-side extension portion" means being located between a straight line made by the left-side first end portion and a straight line made by the left-side second end portion.

According to the aspect, the first link mechanism and the second link mechanism are located between the right-side first end portion and the right-side second end portion of the first right-side extension portion, and are located between the left-side first end portion and the left-side second end portion of the first left-side extension portion when the first extension portion is in the stored state. As a result, when the first extension portion is in the stored state, the reduction in size including an area occupied by the first link mechanism and the second link mechanism can be realized.

A ninth aspect of the present disclosure provides the medium support device according to the first aspect, in which a side surface that forms the right-side second end portion of the first right-side extension portion and a side surface that forms the left-side first end portion of the first left-side extension portion have first areas from base ends that are in contact and second areas that are not in contact in the extended state, and the non-contact second areas are separated in a direction in which the side surfaces are mutually separated toward tips.

According to the aspect, in the extended state, the side surface forming the right-side second end portion of the first right-side extension portion and the side surface forming the left-side first end portion of the first left-side extension portion are in contact in the first areas from the base ends. By the "contact", the rigidity of the first right-side extension portion and the first left-side extension portion in the extended state can be improved. In addition, the second areas of the first right-side extension portion and the first left-side extension portion are not in contact, and the non-contact second areas are configured to be separated in a direction in which the side surfaces are mutually separated toward tips. Therefore, compared to a structure in which all of the side surfaces are in contact, a medium is stably supported.

An tenth aspect of the present disclosure provides the medium support device according to the first aspect, in which the second extension portion has a handle portion that is engaged with the medium support portion in the stored state.

According to the aspect, since the second extension portion has the handle portion, when the handle portion is put by a finger of a hand or the like, the operation to the extended state can be easily performed. In addition, the handle portion is engaged with the medium support portion in the stored state, the retention property to retain the stored state of the second extension portion is improved.

A 11th aspect of the present disclosure provides the medium support device according to the tenth aspect, in which a part of the handle portion projects from the medium support portion in a width direction intersecting the transport direction and the depth direction. Here, the phrase "projects from the medium support portion" means that a part of the handle portion is exposed so as to be extendable and operatable with respect to the medium support portion by a finger or the like.

According to the aspect, since a part of the handle portion projects from the medium support portion as described above, the user can easily use the handle portion by a hand or the like.

A 12th aspect of the present disclosure provides the medium support device according to the first aspect, in which the first extension portion has a regulating portion that is engaged with the medium support portion in the stored state.

According to the aspect, the first extension portion has the regulating portion that is engaged with the medium support portion in the stored state, the retention property to retain the stored state of the first extension portion is improved.

A 13th aspect of the present disclosure provides the medium support device according to the 12th aspect, in which the regulating portion projects toward a surface of a medium that is mounted when the first extension portion is in the extended state.

According to the aspect, when the first extension portion is in the extended state, the regulating portion comes into contact with a surface of the medium that is mounted so as to change the orientation of the medium from a plane orientation to a curved surface orientation. As a result, the medium that is supported by the first extension portion is less likely to be inclined to the front side.

A 14th aspect of the present disclosure provides the medium support device according to the 12th aspect, in which the second extension portion has a handle portion that is engaged with the medium support portion in the stored state, and the handle portion overlaps with at least a part of the regulating portion when viewed in the depth direction in the stored state.

According to the aspect, the handle portion included in the second extension portion overlaps with at least a part of the regulating portion when viewed in the depth direction in the stored state. As a result, the device can be reduced in size in the width direction.

A 15th aspect of the present disclosure provides the medium support device according to any one of the first to the 15th aspects, in which the medium support portion is configured to open and close, by pivoting, a transport entrance through which the medium is transported, is configured to support the medium in the open state, and has an orientation along the depth direction in the closed state, and the first extension portion entirely overlaps with the medium support portion in plan view in a state in which the first extension portion is stored in the medium support portion in the closed state.

According to the aspect, the medium support portion can open and close, by pivoting, the transport entrance through which the medium is transported and has an orientation along the depth direction in the closed state. Moreover, in a state in which the first extension portion is stored in the medium support portion in the closed state, the first extension portion entirely overlaps with the medium support portion in plan view. As a result, in a non-use state of the medium support device, that is, in a state in which the medium support portion closes the transport entrance, the device can be reduced in size in the depth direction.

A 16th aspect of the present disclosure provides a medium support device including a medium support portion that has a medium support surface on which a medium is supported such that the medium is configured to be transported in a transport direction, and an extension support portion that is provided in the medium support portion, in which the extension support portion has a first extension portion that is configured to be displaced between a stored state in which the first extension portion is stored in the medium support portion and an extended state in which the first extension portion is rotated with respect to the medium support portion to be extended and supports the medium together with the medium support portion, and a second extension portion that is configured to be displaced between a stored state in which the second extension portion is stored in the first extension portion and an extended state in which the second extension portion is slid from the first extension portion in a first direction to be extended and supports the medium together with the first extension portion, the first extension portion has a first right-side extension portion that is located further on a right side than a center position of the medium support portion, and a first left-side extension portion that is located further on a left side than the center position when viewed from a front side in a depth direction intersecting the transport direction, the second extension portion has a second right-side extension portion that is stored in the first right-side extension portion and a second left-side extension portion that is stored in the first left-side extension portion, the second right-side extension portion entirely overlaps with the first right-side extension portion in the stored state when viewed in the depth direction, the second left-side extension portion entirely overlaps with the first left-side extension portion when viewed in the depth direction in the stored state, the medium support portion is configured to open and close, by pivoting, a transport entrance through which the medium is transported, is configured to support the medium in the open state, and has an orientation along the depth direction in the closed state, and the first extension portion entirely overlaps with the medium support portion in plan view in a state in which the first extension portion is stored in the medium support portion in the closed state.

According to the aspect, the medium support portion can open and close, by pivoting, the transport entrance which the medium is transported and has an orientation along the depth direction in the closed state. Moreover, in a state in which the first extension portion is stored in the medium support portion in the closed state, the first extension portion entirely overlaps with the medium support portion in plan view. As a result, in a non-use state of the medium support device, that is, in a state in which the medium support portion closes the transport entrance, the device can be reduced in size in the depth direction.

An 17th aspect of the present disclosure provides a reading device including a reading unit that reads an image of a medium, and a medium support device including a medium support portion that has a medium support surface on which the medium is supported such that the medium is configured to be transported in a transport direction toward the reading unit, and an extension support portion that is provided in the medium support portion, in which the medium support device is the medium support device according to the first aspect.

According to the aspect, as a reading device such as a scanner, effects that can be obtained in the medium support device according to any one of the first to the 15th aspects can be obtained.

A 18th aspect of the present disclosure provides a reading device including a reading unit that reads an image of a medium, and a medium support device including a medium support portion that has a medium support surface on which the medium is supported such that the medium is configured to be transported in a transport direction toward the reading unit, and an extension support portion that is provided in the medium support portion, in which the medium support device is the medium support device according to the 16th aspect.

According to the aspect, as a reading device such as a scanner, effects that can be obtained in the medium support device according to the 16th aspect can be obtained.

Hereinafter, a medium support device according to a first embodiment of the present disclosure, and a reading device including the medium support device will be specifically described with reference to FIGS. 1 to 9. In the following description, three axes that are orthogonal to each other are an X-axis, a Y-axis, and a Z-axis as illustrated in each figure. Directions directed by the arrows of the three axes (X, Y, and Z) are positive directions of the respective directions, and directions opposite thereto are negative directions. The Z-axis direction corresponds to a vertical direction and a gravity acting direction, a +Z direction indicates vertically upward, and −Z direction indicates vertically downward. The X-axis direction and the Y-axis direction correspond to horizontal directions. A +Y direction indicates a forward direction of a device, and a −Y direction indicates a rear direction of the device. A +X direction indicate a right direction of the device, and a −X direction indicates a left direction of the device.

Overall Configuration of Reading Device

Figure 2:
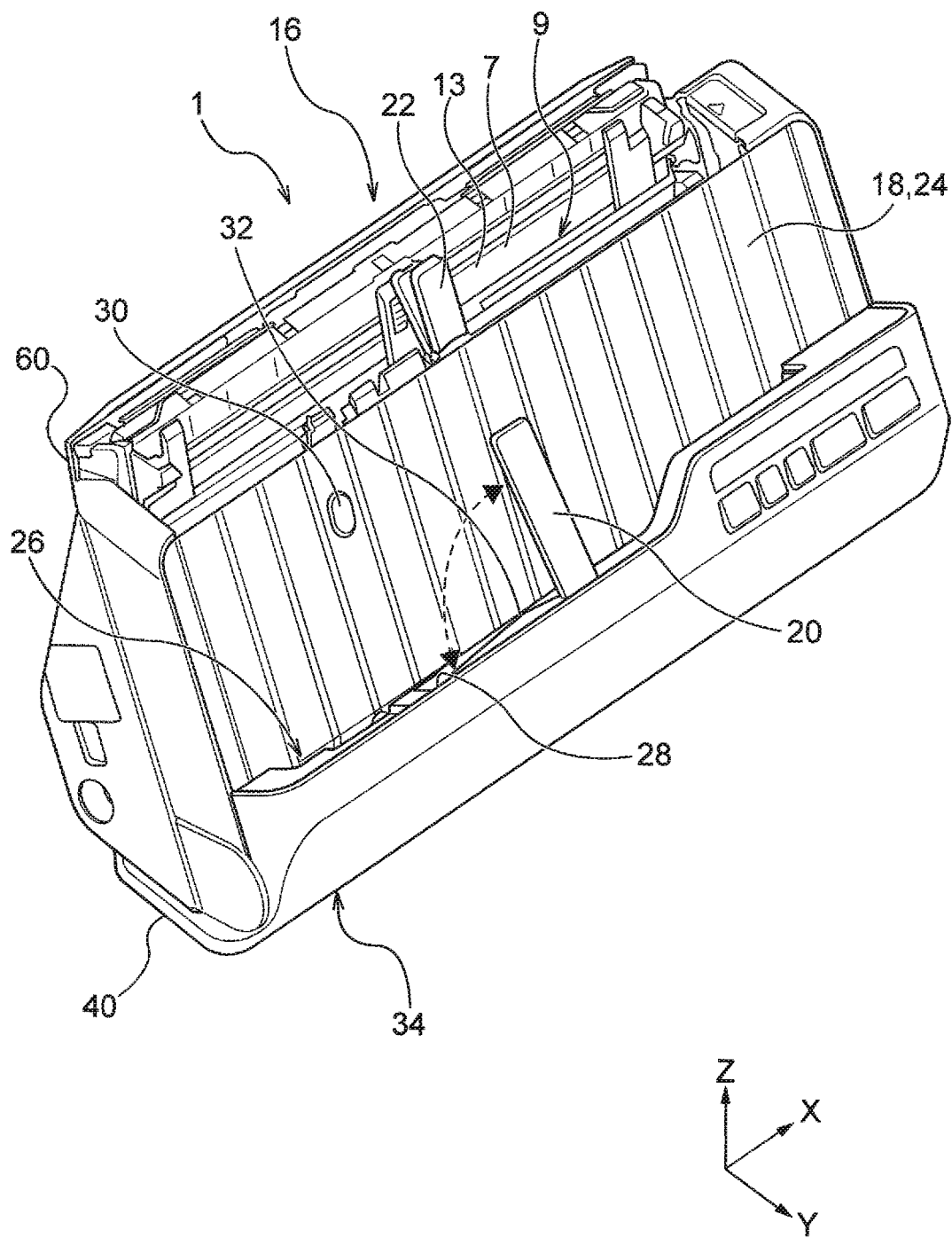
FIG. 2 is a perspective view of the extension support portion according to the first embodiment in a stored state viewed from a left front side.
Figure 3:
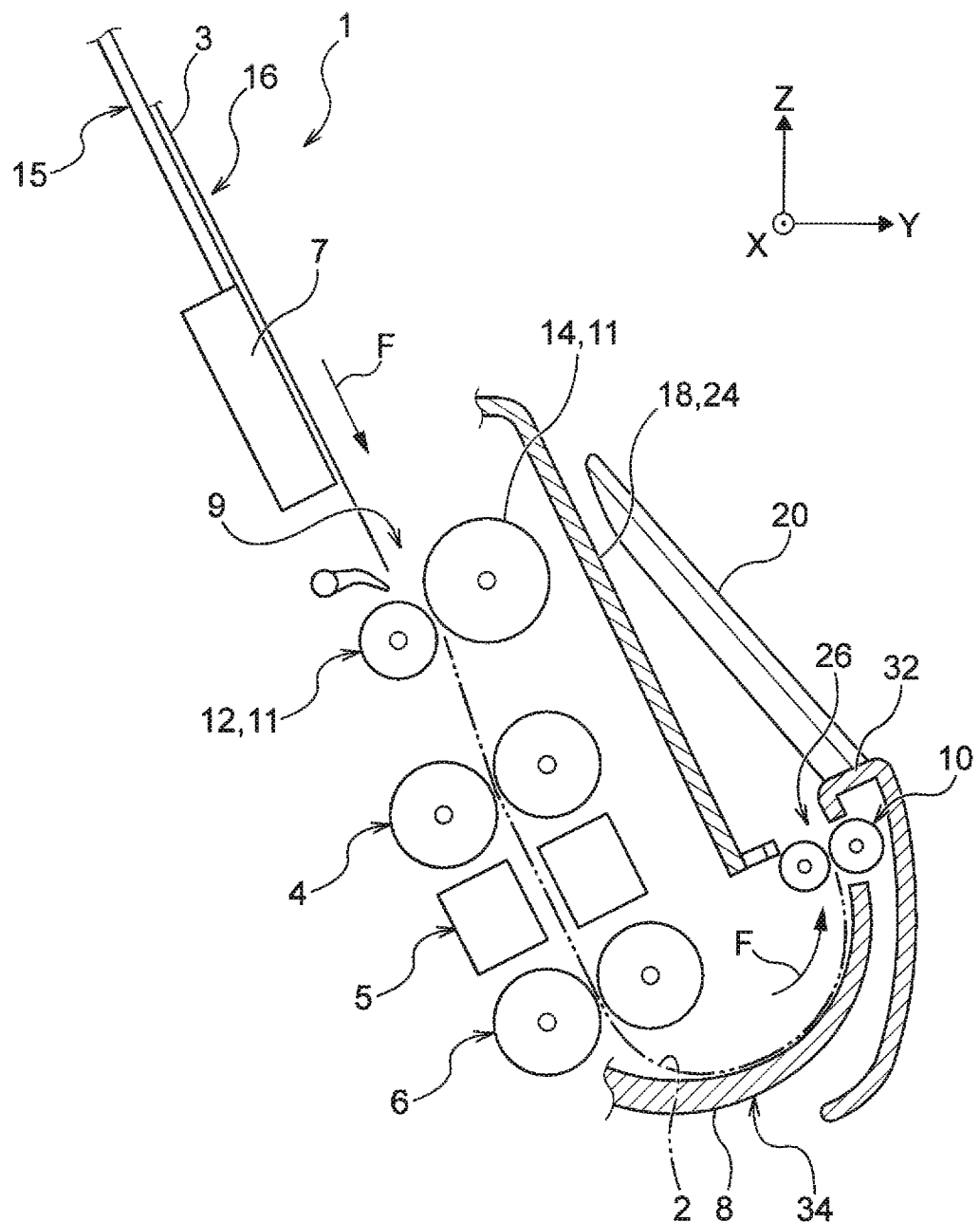
FIG. 3 is a schematic side sectional view in a use state according to the first embodiment.

A reading device according to the present embodiment is a scanner configured to read an image of a medium. Here, the image means an image that is visually recorded on the medium, and examples include characters, figures, charts, pictures, photographs, and the like. In addition, the medium is not limited to a sheet and includes a card, a booklet, and the like. As illustrated in FIGS. 1 to 3, a reading device 1 includes a reading unit 5 that is capable of reading an image of a medium 3 (FIG. 3) and a medium support device 16. The medium support device 16 includes a medium support portion 7 that has a medium support surface 13 on which the medium 3 is supported such that the medium 3 can be transported in a transport direction F toward the reading unit 5, and an extension support portion 15 that is provided in the medium support portion 7. As illustrated in FIGS. 1 and 3, the medium support surface 13 is an inclined surface that is inclined in a rear direction (the −Y direction) of the device 1. As illustrated in FIG. 3, a transport entrance 9 through which the medium 3 is transported is provided downstream of the medium support portion 7 in the transport direction. Moreover, along a transport path 2 represented by a two-dot chain line, a pair of feeding rollers 11, a pair of first transport rollers 4, the reading unit 5, a pair of second transport rollers 6, a reversal section 8, and a pair of discharge rollers 10 are disposed in this order.

The pair of feeding rollers 11 includes a pair of a feeding roller 12 and a separation roller 14 to which power is transmitted from a driving source (not illustrated). The medium 3 supported by the medium support portion 7 is fed one by one to the transport path 2 by the pair of feeding rollers 11. The medium 3 fed to the transport path 2 receives a transport force from the pair of first transport rollers 4 to be transported through the transport path 2, passes through a reading area of the reading unit 5, and further receives a transport power from the pair of second transport rollers 6 to be transported, and the transport direction F is reversed in the reversal section 8. In addition, the medium 3 is discharged by the pair of discharge rollers 10 located at an end point of the transport path 2 to a discharge receiving portion 18 after departing from the transport path 2. A discharge port 26 is a discharge port of the medium 3. As illustrated in FIG. 3, a receiving surface 24 of the discharge receiving portion 18 is an inclined surface that is inclined in the rear direction (the −Y direction) of the device 1 similarly to the medium support surface 13 of the medium support portion 7. Power from a driving source (not illustrated) is transmitted to the pair of first transport rollers 4, the pair of second transport rollers 6, and the pair of discharge rollers 10. Each operation of the pair of feeding rollers 11, the pair of first transport rollers 4, the reading unit 5, the pair of second transport rollers 6, and the pair of discharge rollers 10 is performed by a control signal from a control unit (not illustrated).

As illustrated in FIGS. 1 to 3, a first support piece 20 is provided and elongated obliquely upward from a position that is an end portion of the transport path 2 in the transport direction F and is more downstream than is the pair of discharge rollers 10. The first support piece 20 is erected from a structure member 32 constituting the discharge port 26 and is extended such that the upper end gradually approaches the receiving surface 24 of the discharge receiving portion 18. Moreover, a second support piece 22 (FIG. 1) is provided upward from a position on a back side of the receiving surface 24 of the discharge receiving portion 18. The first support piece 20 and the second support piece 22 are disposed substantially at the center in a left-right direction of the device 1.

Figure 11:
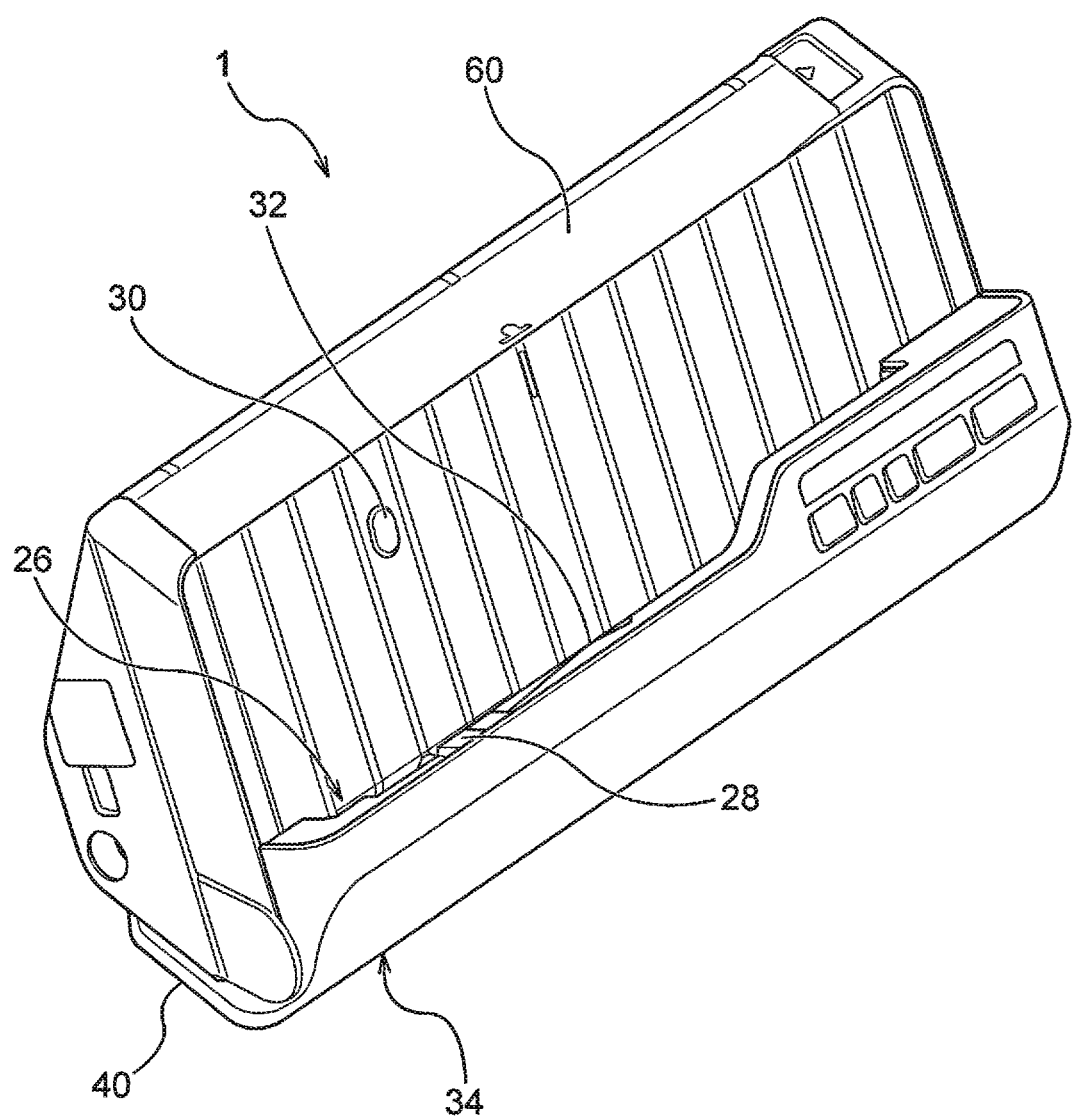
FIG. 11 is a perspective view of a second embodiment in a non-use state viewed from a front left side.

The first support piece 20 comes into contact with and supports the front surface of the medium 3 that is discharged to the discharge receiving portion 18, and the second support piece 22 comes into contact with and supports the back surface of the medium 3, whereby the medium 3 is supported from the front and back sides. When a first button 28 (FIG. 2) is pressed, the first support piece 20 advances to the position in use in FIGS. 1 and 2. Furthermore, when the first button 28 is pressed or operated by hand, the first support piece 20 is moved to a retreat position behind the structure member 34 constituting the reversal section 8 and, as illustrated in FIG. 11 described later, becomes invisible from the front. In addition, when a second button 30 is pressed, the second support piece 22 also advances to the position in use in FIGS. 1 and 2. Furthermore, when the second button 30 is pressed or operated by hand, the second support piece 22 is moved to a retreat position behind the receiving surface 24 of the discharge receiving portion 18 and becomes invisible from the front.

Medium Support Device

As described above, the medium support device 16 according to the present embodiment includes the medium support portion 7 that has the medium support surface 13 on which the medium 3 is supported such that the medium 3 can be transported in the transport direction F, and the extension support portion 15 that is provided in the medium support portion 7. Hereinafter, the configuration is specifically described.

Extension Support Portion

As illustrated in FIGS. 1, 2, and 4 to 8, the extension support portion 15 is located on the back side of the medium support surface 13 of the medium support portion 7 and substantially at the center in a width direction (the X-axis direction) and is formed of a substantially plate-like member that is long and narrow as a whole. In addition, the extension support portion 15 has a first extension portion 17 that can be displaced between a stored state (state in FIGS. 2 and 4) in which the first extension portion 17 is stored with respect to the medium support portion 7 and an extended state (state in FIGS. 1 and 5) in which the first extension portion 17 is rotated with respect to the medium support portion 7 so as to be extended and supports the medium 3 together with the medium support portion 7. Moreover, the extension support portion 15 has a second extension portion 19 that can be displaced between a stored state in which the second extension portion 19 is stored in the first extension portion 17 (state in FIGS. 2 and 4) and an extended state (state in FIGS. 1 and 5) in which the second extension portion 19 is slid from the first extension portion 17 in a first direction A to be extended and supports the medium 3 together with the first extension portion 17.

As illustrated in FIG. 1, the first extension portion 17 includes a first right-side extension portion 17R located further on a right side than the center position of the medium support portion 7, when viewed from a front side (the +Y side) in the depth direction (the Y-axis direction) intersecting the transport direction F, and a first left-side extension portion 17L located further on a left-side than the center position. Moreover, as illustrated in FIGS. 5 and 6, at the base end of the first right-side extension portion 17R, a right-side gear 23R that forms a right-side rotation fulcrum 21R of the first right-side extension portion 17R is disposed. In addition, at the base end of the first left-side extension portion 17L, a left-side gear 23L that forms a left-side rotation fulcrum 21L of the first left-side extension portion 17L and is engaged with the right-side gear 23R is disposed. Here, a structure in which the right-side gear 23R and the left-side gear 23L are directly engaged is illustrated, but a structure in which the right-side gear 23R and the left-side gear 23L are indirectly engaged with another gear interposed therebetween may be adopted. As illustrated in FIGS. 1, and 4 to 8, the first right-side extension portion 17R and the first left-side extension portion 17L constituting the first extension portion 17 are disposed symmetrically on the right and left sides with respect to the center position of the medium support portion 7, respectively.

Figure 4:
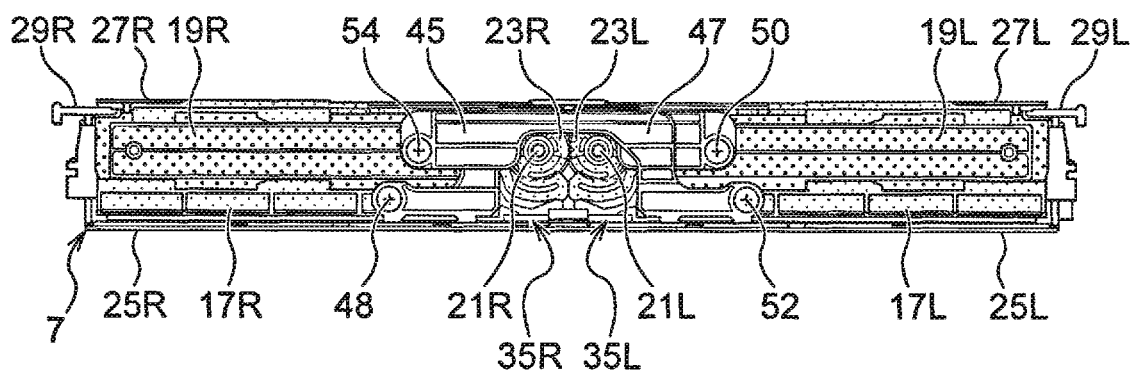
FIG. 4 is a rear view of an important portion illustrating the stored state of the extension support portion according to the first embodiment.
Figure 4:
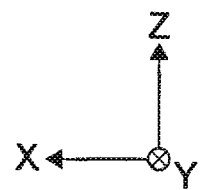
Figure 5:
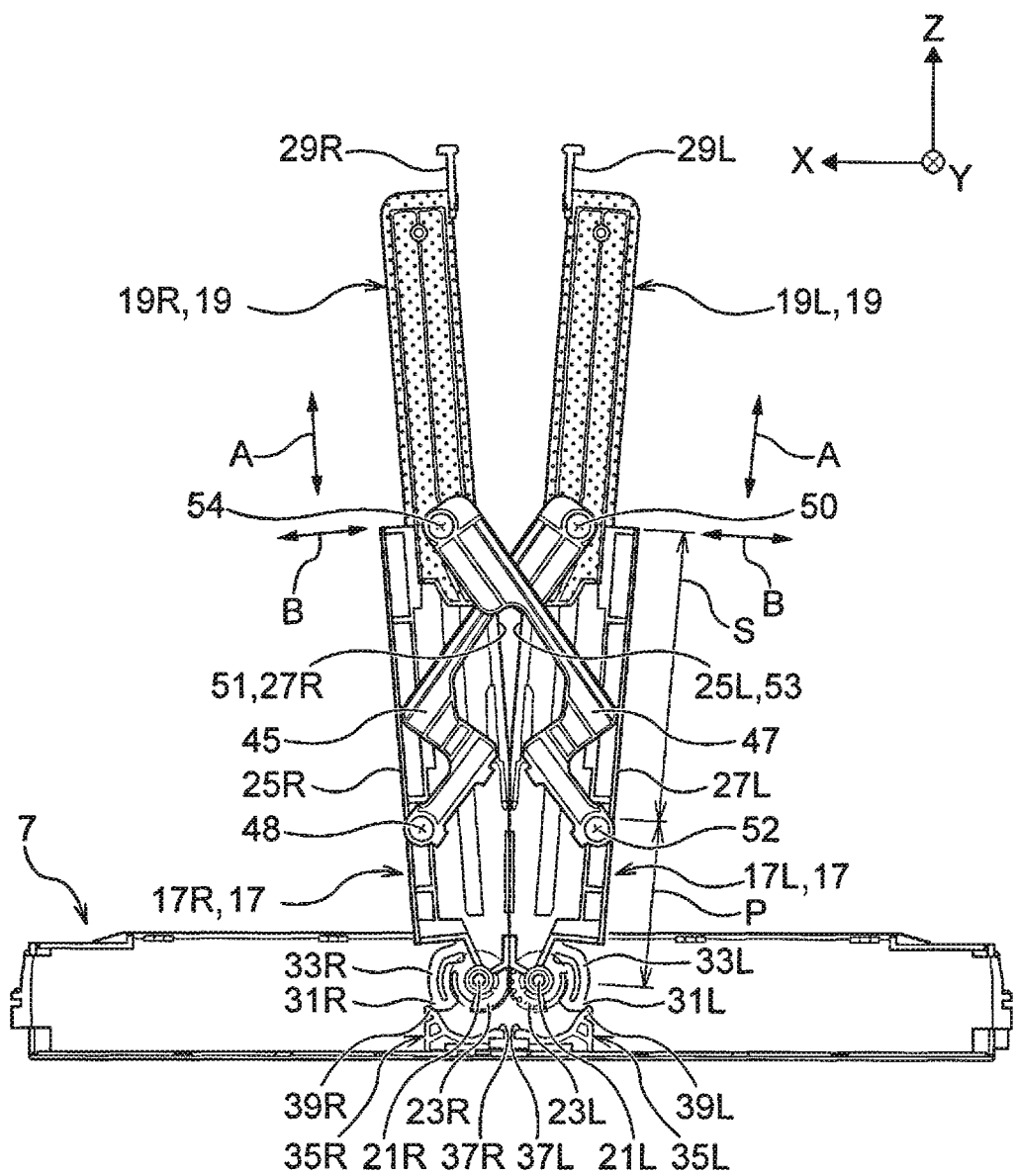
FIG. 5 is a rear view of an important portion illustrating the extended state of the extension support portion according to the first embodiment.

As illustrated in FIGS. 1, 4, and 5, the first right-side extension portion 17R has a right-side first end portion 25R and a right-side second end portion 27R facing the right-side first end portion 25R in a width direction, which is a second direction B intersecting the first direction A. Similarly, the first left-side extension portion 17L has a left-side first end portion 25L and a left-side second end portion 27L facing the left-side first end portion 25L in the second direction B. In addition, as illustrated in FIGS. 4 and 5, the right-side gear 23R is provided so as to be located between the right-side first end portion 25R and the right-side second end portion 27R of the first right-side extension portion 17R. Similarly, the left-side gear 23L is provided so as to be located between the left-side first end portion 25L and the left-side second end portion 27L of the first left-side extension portion 17L. Here, the phrase "located between" of "located between the right-side first end portion 25R and the right-side second end portion 27R" means being located between a straight line made by the right-side first end portion 25R and a straight line made by the right-side second end portion 27R. Similarly, the phrase "located between" of "located between the left-side first end portion 25L and the left-side second end portion 27L" means being located between a straight line made by the left-side first end portion 25L and a straight line made by the left-side second end portion 27L. In the following description, the phase "located between" is used as a phrase having the same meaning described above.

Moreover, the second extension portion 19 has a second right-side extension portion 19R that is stored in the first right-side extension portion 17R, and a second left-side extension portion 19L that is stored in the first left-side extension portion 17L. From FIGS. 1, and 4 to 8, the second right-side extension portion 19R and the second left-side extension portion 19L constituting the second extension portion 19 are also disposed symmetrically on the right and left sides with respect to the center position of the medium support portion 7, respectively. In addition, in the stored state (FIGS. 2 and 4), the second right-side extension portion 19R is configured to entirely overlap with the first right-side extension portion 17R when viewed in the depth direction (the Y-axis direction). Similarly, in the stored state (FIGS. 2 and 4), the second left-side extension portion 19L is configured to entirely overlap with the first left-side extension portion 17L when viewed in the depth direction (the Y-axis direction). Here, the phrase "entirely overlap" means that the contour of the second extension portion 19 viewed in the depth direction of the second extension portion 19 exists inside the contour of the first extension portion 17 viewed in the depth direction. In FIG. 1, a medium support surface 44R is a medium support surface of the first right-side extension portion 17R, and a medium support surface 44L is a medium support surface of the first left-side extension portion 17L. In addition, a medium support surface 46R is a medium support surface of the second right-side extension portion 19R, and a medium support surface 46L is a medium support surface of the second left-side extension portion 19L. Here, the medium support surfaces 44R and 44L are configured through sticking of a sticker.

In the present embodiment, as illustrated in FIGS. 2 and 4, the first extension portion 17 is configured to entirely overlap with the medium support portion 7 viewed in the depth direction (the Y-axis direction) in a state in which the first extension portion 17 is stored in the medium support portion 7. Here, the phrase "entirely overlap" means that the contour of the first extension portion 17 viewed in the depth direction (the Y-axis direction) exists inside the contour of the medium support portion 7 viewed in the depth direction (the Y-axis direction). In this state, the second extension portion 19 is stored in the first extension portion 17. As understandable from the above description, the second extension portion 19 stored in the first extension portion 17 is also configured to entirely overlap with medium support portion 7 viewed in the depth direction (the Y-axis direction).

Elastic Deformation Portion, Contact Portion, and Engaged Portion

Figure 6A:
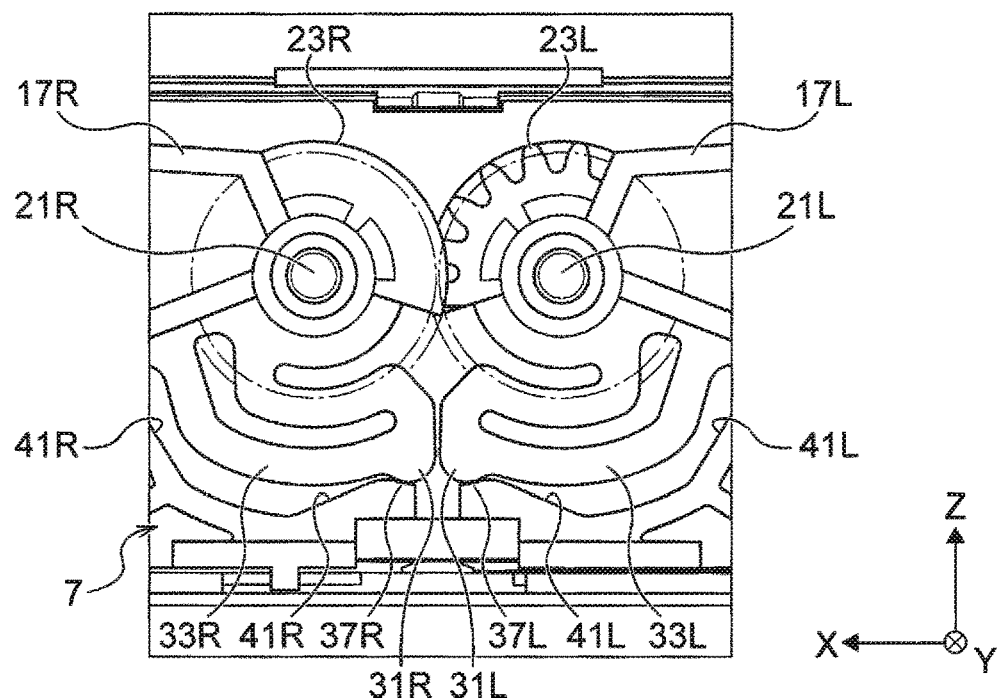
FIG. 6A is an enlarged rear view of an important portion illustrating the stored state of the extension support portion according to the first embodiment.
Figure 6B:
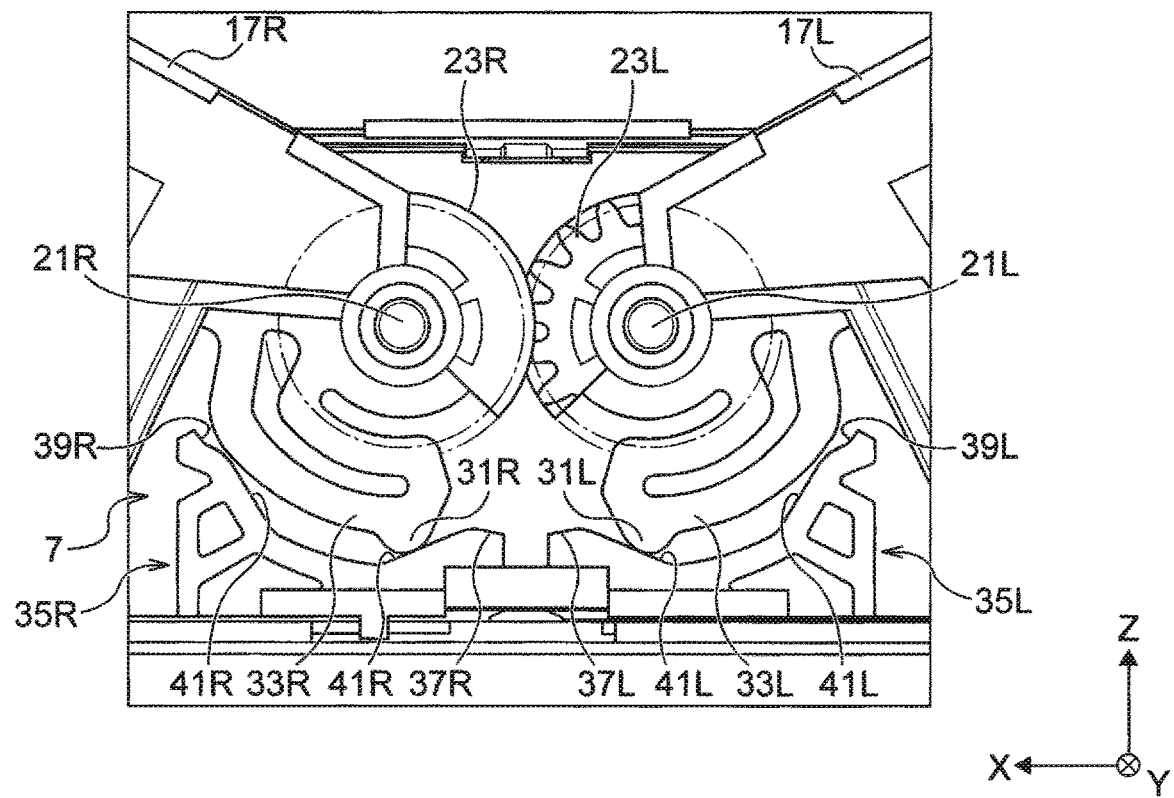
FIG. 6B is an enlarged rear view of an important portion illustrating a state in which the extension support portion is being extended.
Figure 7:
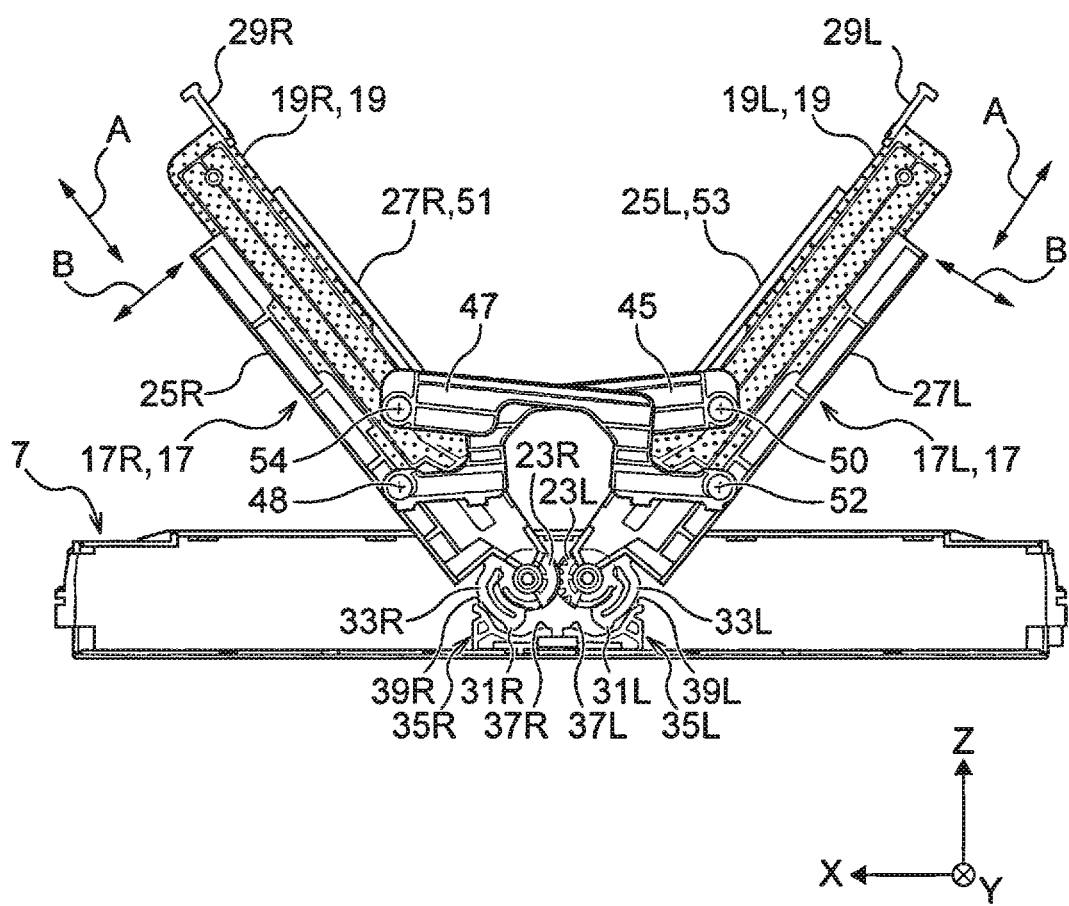
FIG. 7 is a rear view of an important portion illustrating the state in which the extension support portion according to the first embodiment is being extended.

In addition, in the present embodiment, as illustrated in FIGS. 5 to 7, the first right-side extension portion 17R has, at the base end, a right-side elastic deformation portion 33R that is elastically deformable and provided with a right-side projection 31R. The first right-side extension portion 17R has the right-side elastic deformation portion 33R as a right-side engagement portion. The first left-side extension portion 17L has, at the base end, a left-side elastic deformation portion 33L that is elastically deformable and provided with a left-side projection 31L. The first left-side extension portion 17L has the left-side elastic deformation portion 33L as a right-side engagement portion. In addition, the medium support portion 7 has a right-side contact portion 35R that comes into contact with the right-side projection 31R and a left-side contact portion 35L that comes into contact with the left-side projection 31L. In addition, the right-side contact portion 35R has a first right-side engaged portion 37R that is engaged with the right-side projection 31R when the first right-side extension portion 17R is in the stored state (FIG. 6A), and a second right-side engaged portion 39R that is engaged with the right-side projection 31R when the first right-side extension portion 17R is in the extended state (FIG. 5). In addition, the left-side contact portion 35L has a first left-side engaged portion 37L that is engaged with the left-side projection 31L when the first left-side extension portion 17L is in the stored state (FIG. 6A), and a second left-side engaged portion 39L that is engaged with the left-side projection 31L when the first left-side extension portion 17L is in the extended state (FIG. 5).

Figure 8:
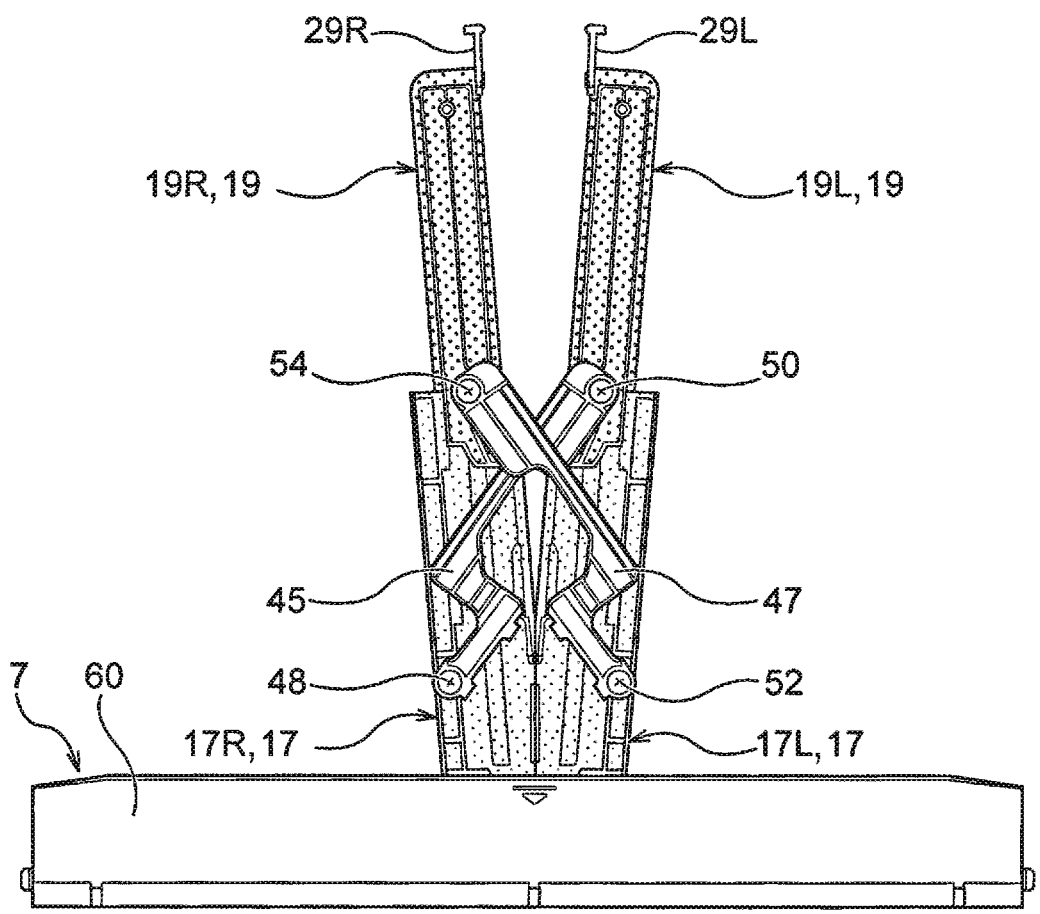
FIG. 8 is a rear view of an important portion illustrating the extended state in which a medium support portion according to the first embodiment with a cover.

In the present embodiment, as illustrated in FIGS. 6A and 6B, the right-side contact portion 35R has two right-side wall portions 41R. In addition, the right-side elastic deformation portion 33R is elastically deformed toward the right-side rotation fulcrum 21R of the first right-side extension portion 17R when the right-side projection 31R comes into contact with one of the right-side wall portions 41R and moves so as to be engaged with the first right-side engaged portion 37R or the second right-side engaged portion 39R. Similarly, the left-side contact portion 35L has two left-side wall portions 41L. In addition, the left-side elastic deformation portion 33L is elastically deformed toward the left-side rotation fulcrum 21L of the first left-side extension portion 17L when the left-side projection 31L comes into contact with one of the left-side wall portions 41L and moves so as to be engaged with the first left-side engaged portion 37L or the second left-side engaged portion 39L. In FIG. 8, an outer cover 60 is an outer cover of the medium support portion 7. In FIGS. 4 to 7, the outer cover 60 is not illustrated so that the inside is visible. The first extension portion 17 and the second extension portion 19 are disposed between a member forming the medium support surface 13 and the outer cover 60.

In addition, as illustrated in FIG. 5, in the present embodiment, the right-side elastic deformation portion 33R is located between the right-side first end portion 25R and the right-side second end portion 27R of the first right-side extension portion 17R. Similarly, the left-side elastic deformation portion 33L is located between the left-side first end portion 25L and the left-side second end portion 27L of the first left-side extension portion 17L. Here, the phrase "located between" has the same meaning described above.

Interlocking

In the present embodiment, as illustrated in FIGS. 4 to 7, the second right-side extension portion 19R can be displaced, interlocking with rotation and displacement of the first extension portion 17. The second right-side extension portion 19R can be displaced between the stored state in which the second right-side extension portion 19R is stored in the first right-side extension portion 17R and the extended state in which the second right-side extension portion 19R is slid from the first right-side extension portion 17R to be extended and supports the medium 3 together with the first right-side extension portion 17R. Similarly, the second left-side extension portion 19L can be displaced between the stored state in which the second left-side extension portion 19L is stored in the first left-side extension portion 17L and the extended state in which the second left-side extension portion 19L is slid from the first left-side extension portion 17L to be extended and supports the medium 3 together with the first left-side extension portion 17L. Note that the second extension portion 19 does not have to have a structure in which the second extension portion 19 is displaced, interlocking with the rotation and displacement of the first extension portion 17, and may have another extension structure such as a structure in which the second extension portion 19 is manually extended from the first extension portion 17. In the present embodiment, a first link mechanism 45 that couples the first right-side extension portion 17R to the second left-side extension portion 19L, and a second link mechanism 47 that couples the first left-side extension portion 17L to the second right-side extension portion 19R are included. Screw portions 48, 50, 52, and 54 are screw portions for the coupling. In addition, the first link mechanism 45 and the second link mechanism 47 are configured to perform the interlocking. The screw portions 48, 50, 52, and 54 couple the first link mechanism 45 to the second link mechanism 47 so that linking operation for the interlocking is operated.

When the first extension portion 17 is in the stored state (FIG. 4), the first link mechanism 45 and the second link mechanism 47 are configured to be located between the right-side first end portion 25R and the right-side second end portion 27R of the first right-side extension portion 17R and be also located between the left-side first end portion 25L and the left-side second end portion 27L of the first left-side extension portion 17L. Here, the phrase "located between" has the same meaning described above.

In addition, in the present embodiment, as illustrated in FIG. 5, a side surface 51 that forms the right-side second end portion 27R of the first right-side extension portion 17R and a side surface 53 that forms the left-side first end portion 25L of the first left-side extension portion 17L have first areas P from base ends that are in contact, and second areas S that are not in contact in the extended state. The non-contact second areas S are configured to be separated in a direction in which the side surface 51 and the side surface 53 and are mutually separated toward tips. The dimension of the first areas P in which the side surface 51 and the side surface 53 are in contact with each other is set such that it is appropriate to say that the rigidity of the first extension portion 17 in the extended state is increased as a whole by the contact of the side surface 51 and the side surface 53.

Figure 9:
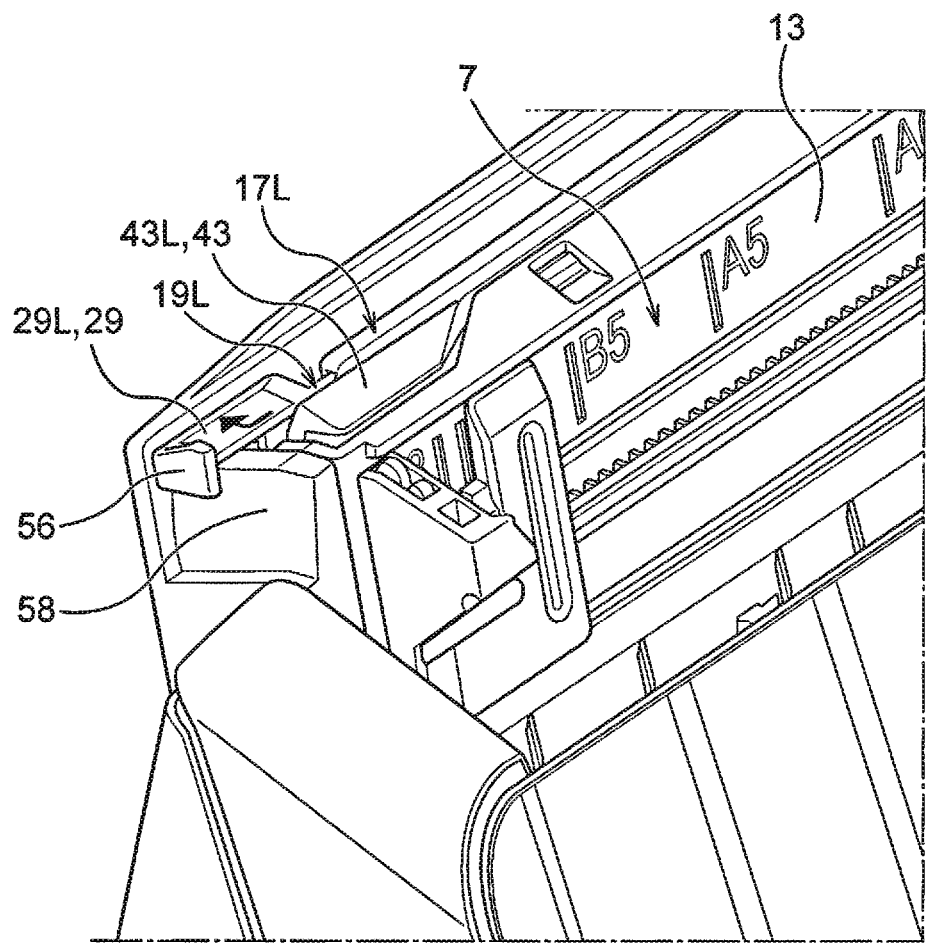
FIG. 9 is a perspective view of an important portion of the reading device according to the first embodiment viewed from a left front side.

In addition, in the present embodiment, as illustrated in FIGS. 1, 8, and 9, the second extension portion 19 has a handle portion 29 in a tip portion thereof. The handle portion 29 includes a right-side handle portion 29R and a left-side handle portion 29L. When the first extension portion 17 is shifted from the stored state to the extended state by being rotated with respect to the medium support portion 7, one or both of the right-side handle portion 29R and the left-side handle portion 29L are put by hand to easily perform extension operation. The handle portions 29R and 29L each have a substantially L-shape here, but, of course, the shape is not limited thereto. As illustrated in FIGS. 4, 8, and 9, the left-side handle portion 29L has an engagement portion 56 and is configured to be engaged with an engaged portion 58 of the medium support portion 7 in the stored state. In other words, the engagement portion 56, which is a part of the left-side handle portion 29L projects from the medium support portion 7 in a width direction (the X-axis direction) intersecting the transport direction F and the depth direction (the Y-axis direction). Here, the phrase "projects from the medium support portion 7" means that a part of the handle portion 29L is exposed so as to be extendable and operatable with respect to the medium support portion 7 by a finger or the like. Note that the right-side handle portion 29R has basically the same structure as the left-side handle portion 29L, and thus the description thereof will be omitted.

Figure 10:
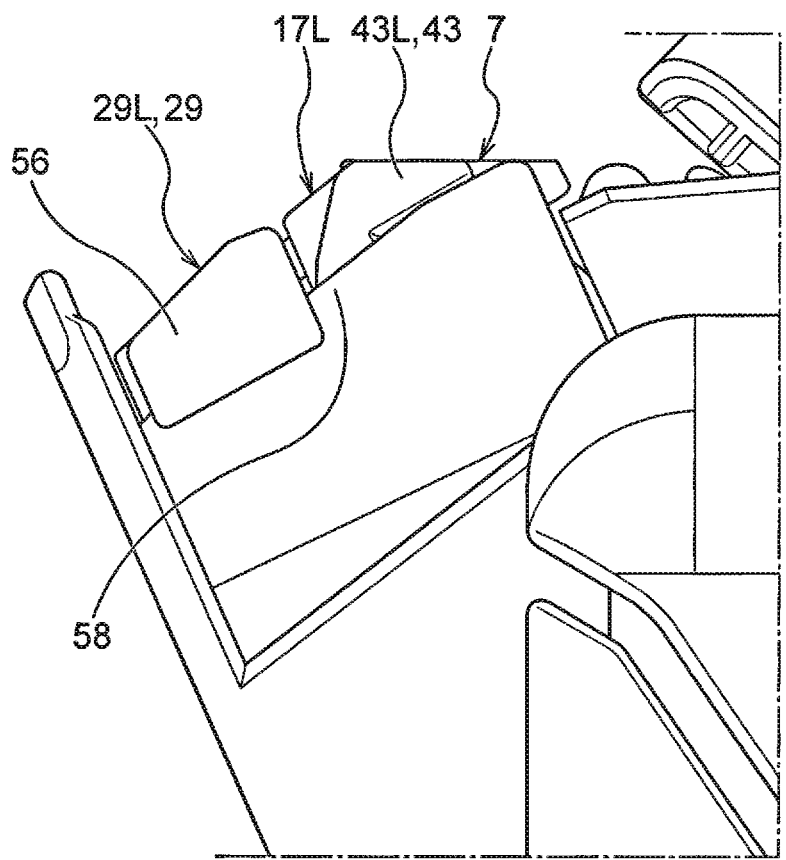
FIG. 10 is a side view of an important portion of the reading device according to the first embodiment viewed from a lateral side.

In addition, in the present embodiment, as illustrated in FIGS. 1, and 8 to 10, the first extension portion 17 has a regulating portion 43 that is engaged with the medium support portion 7 in the stored state. The regulating portion 43 includes a right-side regulating portion 43R and a left-side regulating portion 43L. In addition, when the first extension portion 17 is in the extended state (FIG. 1), the regulating portion 43 projects toward a surface of the medium 3 that is mounted. By the projection, when the first extension portion 17 is in the extended state, the regulating portion 43 comes into contact with the surface of the medium 3 that is mounted so as to change the orientation of the medium 3 from a plane orientation to a curved surface orientation. As illustrated in FIGS. 9 and 10, the handle portion 29 included in the second extension portion 19 is configured to overlap with at least a part of the regulating portion 43 when viewed in the depth direction in the stored state.

Description of Displacement of First Embodiment from Stored State to Extended State The extension support portion 15 is extended from the state in FIG. 2 to the state in FIG. 1. At this time, first, one or both of the right-side handle portion 29R and the left-side handle portion 29L of the handle portion 29 are put by hand to rotate the first extension portion 17. As a result, the first right-side extension portion 17R and the first left-side extension portion 17L are interlocked by the right-side gear 23R and the left-side gear 23L and extended. At the same time, the second right-side extension portion 19R and the second left-side extension portion 19L are interlocked by the linking of the first link mechanism 45 and the second link mechanism 47 so as to be extended from the first extension portion 17 in the first direction A. In addition, the state is changed to the extended state (FIG. 1) in which the second extension portion 19 supports the medium 3 together with the first extension portion 17. The state can be returned from the extended state to the stored state by performing operation reverse to the above operation.

Description of Effects of First Embodiment

1. In the present embodiment, the second right-side extension portion 19R entirely overlaps with the first right-side extension portion 17R in the stored state when viewed in the depth direction, and the second left-side extension portion 19L entirely overlaps with the first left-side extension portion 17L in the stored state when viewed in the depth direction. Moreover, the right-side gear 23R is provided so as to be located between the right-side first end portion 25R and the right-side second end portion 27R of the first right-side extension portion 17R, and the left-side gear 23L is provided so as to be located between the left-side first end portion 25L and the left-side second end portion 27L of the first left-side extension portion 17L. As a result, in the stored state of the second extension portion 19, an area occupied by the first extension portion 17 and the second extension portion 19 in the second direction B, that is, the transport direction F of the medium 3, can be reduced in size.

2. In addition, in the present embodiment, the first extension portion 17 entirely overlaps with the medium support portion 7 in the stored state of the first extension portion 17 when viewed in the depth direction. As a result, in the stored state of the first extension portion 17, an area occupied by the medium support portion 7, the first extension portion 17, and the second extension portion 19 in the second direction B, that is, the transport direction F of the medium 3, can be reduced in size. 3. In addition, in the present embodiment, the first right-side extension portion 17R has the right-side elastic deformation portion 33R provided with the right-side projection 31R, and the first left-side extension portion 17L has the left-side elastic deformation portion 33L provided with the left-side projection 31L. Moreover, the medium support portion 7 has the right-side contact portion 35R and the left-side contact portion 35L. In addition, the right-side contact portion 35R has the first right-side engaged portion 37R that is engaged with the right-side projection 31R when the first right-side extension portion 17R is in the stored state, and the second right-side engaged portion 39R that is engaged with the right-side projection 31R when the first right-side extension portion 17R is in the extended state. In addition, the left-side contact portion 35L has the first left-side engaged portion 37L that is engaged with the left-side projection 31L when the first left-side extension portion 17L is in the stored state, and the second left-side engaged portion 39L that is engaged with the left-side projection 31L when the first left-side extension portion 17L is in the extended state. As a result, the stored state and the extended state of the first extension portion 17 can be retained by the respective engagements.

4. In addition, in the present embodiment, the right-side elastic deformation portion 33R is located between the right-side first end portion 25R and the right-side second end portion 27R of the first right-side extension portion 17R, and the left-side elastic deformation portion 33L is located between the left-side first end portion 25L and the left-side second end portion 27L of the first left-side extension portion 17L. As a result, the reduction in size including an area occupied by the right-side elastic deformation portion 33R and the left-side elastic deformation portion 33L can be realized. 5. In addition, in the present embodiment, when the right-side projection 31R comes into contact with the right-side wall portion 41R and moves so as to be engaged with the first right-side engaged portion 37R or the second right-side engaged portion 39R, the right-side elastic deformation portion 33R is elastically deformed toward the rotation fulcrum 21R of the first right-side extension portion 17R. Moreover, when the left-side projection 31L comes into contact with the left-side wall portion 41L and moves so as to be engaged with the first left-side engaged portion 37L or the second left-side engaged portion 39L, the left-side elastic deformation portion 33L is elastically deformed toward the rotation fulcrum 21L of the first left-side extension portion 17L. That is, when the first extension portion 17 is rotated with respect to the medium support portion 7, the respective projections 31R and 31L come into contact with the respective wall portions 41R and 41L and move so as to be engaged with the respective engaged portions 37R, 39R, 37L, and 39L, the respective elastic deformation portions 33R and 33L are elastically deformed toward the respective rotation fulcrums 21R and 21L. As a result, when the first extension portion 17 is rotated and displaced between the position in the stored state and the position in the extended state, a load is gradually applied to the rotation of the first extension portion 17 through the wall portions 41R and 41L, and thus the operability of the user can be improved.

6. In addition, in the present embodiment, the second extension portion 19 can be displaced, interlocking with the rotation and displacement of the first extension portion 17. As a result, when the first extension portion 17 is rotated, the second extension portion 19 is interlocked and is also displaced with respect to the first extension portion 17, the operability of the user can be improved. 7. In addition, in the present embodiment, the second right-side extension portion 19R can be slid from the first right-side extension portion 17R to be extended, and the second left-side extension portion 19L can be slid from the first left-side extension portion 17L to be extended. As a result, by the interlocking, the second right-side extension portion 19R and the second left-side extension portion 19L can be contracted and extended with respect to the first right-side extension portion 17R and the first left-side extension portion 17L through sliding, which is a simple structure. 8. In addition, in the present embodiment, the interlocking is performed by the first link mechanism 45 and the second link mechanism 47. As a result, the interlocking can be realized by making the structure simple. 9. In addition, in the present embodiment, when the first extension portion 17 is in the stored state, the first link mechanism 45 and the second link mechanism 47 are located between the right-side first end portion 25R and the right-side second end portion 27R of the first right-side extension portion 17R and are located between the left-side first end portion 25L and the left-side second end portion 27L of the first left-side extension portion 17L, respectively. As a result, when the first extension portion 17 is in the stored state, the reduction in size including an area occupied by the first link mechanism 45 and the second link mechanism 47 can be realized.

10. In addition, in the present embodiment, in the extended state, the side surface 51 forming the right-side second end portion 27R of the first right-side extension portion 17R and the side surface 53 forming the left-side first end portion 25L of the first left-side extension portion 17L are in contact in the first areas P from the base ends. By the "contact", the rigidity of the first right-side extension portion 17R and the first left-side extension portion 17L in the extended state can be improved. In addition, the second areas S of the first right-side extension portion 17R and the first left-side extension portion 17L are not in contact, and the non-contact second areas S are configured to be separated in a direction in which the side surface 51 and the side surface 53 are mutually separated toward tips. Therefore, compared to a structure in which all of the side surfaces are in contact, the medium 3 is stably supported. 11. In addition, in the present embodiment, since the second extension portion 19 has the handle portion 29, when the handle portion 29 is put by a finger of a hand or the like, the operation to the extended state can be easily performed. In addition, since the handle portion 29 is engaged with the medium support portion 7 in the stored state, the retention property to retain the stored state of the second extension portion 19 is improved. 12. In addition, in the present embodiment, since a part of the handle portion 29 projects from the medium support portion 7 as described above, the user can easily use the handle portion 29 by a hand or the like.

13. In addition, in the present embodiment, since the first extension portion 17 has the regulating portion 43 that is engaged with the medium support portion 7 in the stored state, the retention property to retain the stored state of the first extension portion 17 is improved. 14. In addition, in the present embodiment, when the first extension portion 17 is in the extended state, the regulating portion 43 comes into contact with a surface of the medium 3 that is mounted so as to change the orientation of the medium 3 from a plane orientation to a curved surface orientation. As a result, the medium 3 that is supported by the first extension portion 17 is less likely to be inclined to the front side. 15. In addition, in the present embodiment, the handle portion 29 included in the second extension portion 19 overlaps with at least a part of the regulating portion 43 when viewed in the depth direction in the stored state. As a result, the device 1 can be reduced in size in the width direction.

Second Embodiment

Hereinafter, the medium support device 16 according to a second embodiment and the reading device 1 including the first medium support device 16 will be described based on FIGS. 11, and 12A and 12B. The same components as the first embodiment are denoted by the same reference numerals, and description of configurations thereof and corresponding effects is omitted. The medium support device 16 of the second embodiment can open and close the transport entrance 9 (FIG. 2) through which the medium 3 is transported through pivoting of the medium support portion 7. In other words, the medium support portion 7 is configured such that a free end is pivotable using the base end as a pivot fulcrum. In addition, the medium support portion 7 can support the medium 3 in the open state (FIG. 2). In the closed state, as illustrated in FIG. 11, the medium support portion 7 is configured to have an orientation along the depth direction (the Y direction). In addition, the first extension portion 17 is configured to entirely overlap with the medium support portion 7 in plan view in a state in which the first extension portion 17 is stored in the medium support portion 7 in the closed state (FIG. 11). Here, the phrase "entirely overlaps" means that the contour of the first extension portion 17 in plan view exists inside the contour of the medium support portion 7 in plan view. In the present embodiment, the structure of the extension support portion 15 is the same as the first embodiment, and thus the description thereof will be omitted.

Figure 12A:
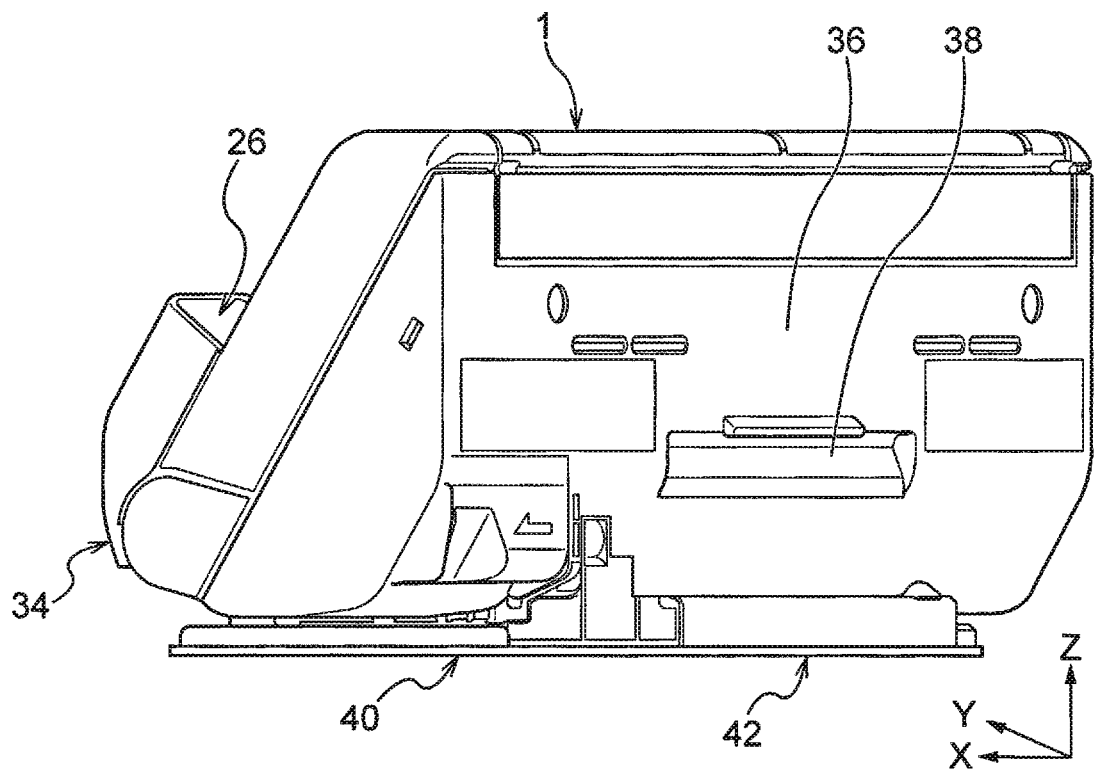
FIG. 12A is a perspective view of the second embodiment in the non-use state.
Figure 12B:
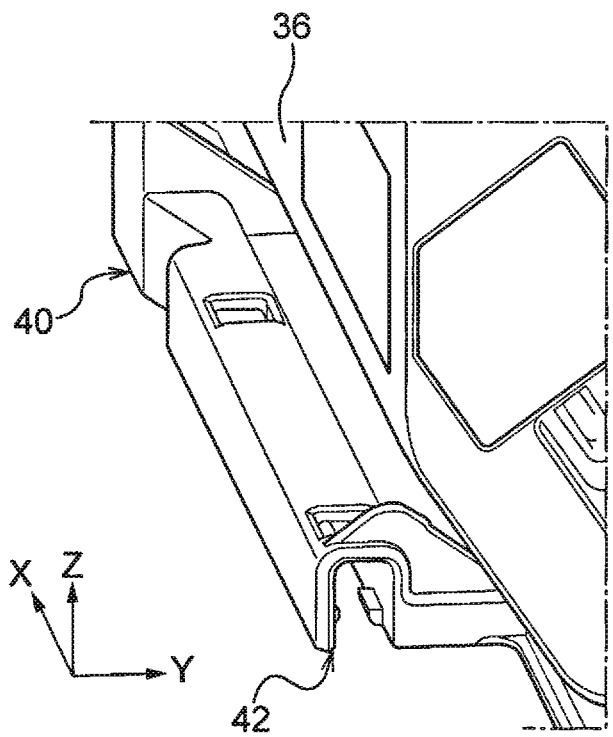
FIG. 12B is an enlarged perspective view of an important portion of the second embodiment in the non-use state.

As illustrated in FIGS. 12A and 12B, the reading device 1 of the present embodiment is provided with a handle portion 38 in a housing constituting a back side portion 36. The handle portion 38 can be put by a hand of the user such that the reading device 1 is lifted. As a result, the reading device 1 can be moved to another place. In addition, the reading device 1 of the present embodiment is provided with a cable storing portion 42 in a rear portion of a bottom portion component member 40. A power cable (not illustrated) of the reading device 1 can be folded and stored in the cable storing portion 42.

According to the embodiment, the medium support portion 7 can open and close, by pivoting, the transport entrance 9 through which the medium 3 is transported and has an orientation along the depth direction in the closed state. Moreover, in a state in which the first extension portion 17 is stored in the medium support portion 7 in the closed state, the first extension portion 17 entirely overlaps with the medium support portion 7 in plan view. As a result, in a non-use state of the medium support device 16, that is, in a state in which the medium support portion 7 closes the transport entrance 9, the device 1 can be reduced in size in the depth direction.

Third Embodiment

Hereinafter, the medium support device 16 according to a third embodiment and the reading device 1 including the medium support device 16 will be described using the figures used in the description of the first embodiment and the second embodiment. The same components as the first embodiment and the second embodiment are denoted by the same reference numerals, and description of configurations thereof and corresponding effects is omitted. The medium support device 16 according to the third embodiment includes the medium support portion 7 that has the medium support surface 13 on which the medium 3 is supported such that the medium 3 can be transported in the transport direction F, and the extension support portion 15 that is provided in the medium support portion 7. The extension support portion 15 has the first extension portion 17 that can be displaced between a stored state in which the first extension portion 17 is stored in the medium support portion 7 and an extended state in which the first extension portion 17 is rotated with respect to the medium support portion 7 to be extended and supports the medium 3 together with the medium support portion 7, and the second extension portion 19 that can be displaced between a stored state in which the second extension portion 19 is stored in the first extension portion 17 and an extended state in which the second extension portion 19 is slid from the first extension portion 17 in the first direction A to be extended and supports the medium 3 together with the first extension portion 17. The first extension portion 17 has the first right-side extension portion 17R located further on the right side than the center position of the medium support portion 7, when viewed from a front side in the depth direction (the Y-axis direction) intersecting the transport direction F, and the first left-side extension portion 17L located further on the left-side than the center position. Moreover, the second extension portion 19 has the second right-side extension portion 19R that is stored in the first right-side extension portion 17R, and the second left-side extension portion 19L that is stored in the first left-side extension portion 17L. The second right-side extension portion 19R entirely overlaps with the first right-side extension portion 17R when viewed in the depth direction, and the second left-side extension portion 19L entirely overlaps with the first left-side extension portion 17L when viewed in the depth direction. The points described above are the same as the first embodiment. The third embodiment is different from the first embodiment in the following configurations.

In the third embodiment, the medium support portion 7 can open and close, by pivoting, the transport entrance 9 through which the medium 3 is transported, can support the medium 3 in the open state, and has an orientation along the depth direction in the closed state. In addition, the first extension portion 17 is configured to entirely overlap with the medium support portion 7 in plan view in a state in which the first extension portion 17 is stored in the medium support portion 7 in the closed state.

As understandable from the above description, in the present embodiment, as a structure in which the first extension portion 17 is rotated, there is no limitation of the right-side gear and the left-side gear of the first embodiment. In place of that, there is a limitation of the configuration in which the medium support portion 7 can open and close, by pivoting, the transport entrance 9 through which the medium 3 is transported, can support the medium 3 in the open state, and has an orientation along the depth direction in the closed state. Note that in the third embodiment, without using the right-side gear 23R and the left-side gear 23L of the first embodiment, by simply using the right-side gear 23R and the left-side gear 23L as a rotation fulcrum structure, the first right-side extension portion 17R and the first left-side extension portion 17L may be separately rotated.

According to the present embodiment, the medium support portion 7 can open and close the transport entrance 9 by pivoting and has an orientation along the depth direction in the closed state. Moreover, in a state in which the first extension portion 17 is stored in the medium support portion 7 in the closed state, the first extension portion 17 entirely overlaps with the medium support portion 7 in plan view. As a result, in a non-use state of the medium support device 16, that is, in a state in which the medium support portion 7 closes the transport entrance 9, the device 1 can be reduced in size in the depth direction.

Other Embodiments

The medium support device 16 according to the present disclosure and the reading device 1 including the medium support device 16 basically have the configurations of the above-described embodiments, but it is of course possible to, for example, change or omit a part of the configurations within a range not departing from the gist of the present disclosure. In the above embodiments, a case in which the device including the medium support device 16 is the reading device 1 such as a scanner has been described, but the present disclosure is of course not limited to the reading device and is applicable to an image forming device such as a printer and the like.

What is claimed is:

1. A medium support device comprising:
a medium support portion that has a medium support surface on which a medium is supported such that the medium is configured to be transported in a transport direction; and
an extension support portion that is provided in the medium support portion, wherein
the extension support portion has
a first extension portion that is configured to be displaced between a stored state in which the first extension portion is stored in the medium support portion and an extended state in which the first extension portion is rotated with respect to the medium support portion to be extended and supports the medium together with the medium support portion, and
a second extension portion that is configured to be displaced between a stored state in which the second extension portion is stored in the first extension portion and an extended state in which the second extension portion is slid from the first extension portion in a first direction to be extended and supports the medium together with the first extension portion, the second extension portion being configured to be displaced, interlocking with rotation and displacement of the first extension portion,
the first extension portion has
a first right-side extension portion that is located further on a right side than a center position of the medium support portion, and a first left-side extension portion that is located further on a left side than the center position when viewed from a front side in a depth direction intersecting the transport direction,
a right-side gear that is located at a base end of the first right-side extension portion and forms a right-side rotation fulcrum of the first right-side extension portion, and a left-side gear that is located at a base end of the first left-side extension portion, forms a left-side rotation fulcrum of the first left-side extension portion, and is engaged with the right-side gear,
the first right-side extension portion includes, in a second direction intersecting the first direction, a right-side first end portion and a right-side second end portion facing the right-side first end portion,
the first left-side extension portion includes, in the second direction, a left-side first end portion and a left-side second end portion facing the left-side first end portion,
the right-side gear is provided to be located between the right-side first end portion and the right-side second end portion of the first right-side extension portion,
the left-side gear is provided to be located between the left-side first end portion and the left-side second end portion of the first left-side extension portion,
the second extension portion has a second right-side extension portion that is stored in the first right-side extension portion and a second left-side extension portion that is stored in the first left-side extension portion,
the second right-side extension portion entirely overlaps with the first right-side extension portion in the stored state when viewed in the depth direction, and
the second left-side extension portion entirely overlaps with the first left-side extension portion when viewed in the depth direction in the stored state.

2. The medium support device according to claim 1, wherein
the first extension portion entirely overlaps with the medium support portion when viewed in the depth direction in the stored state.

3. The medium support device according to claim 1, wherein
the first right-side extension portion has a right-side engagement portion, at the base end, provided with a right-side projection,
the first left-side extension portion has a left-side engagement portion, at the base end, provided with a left-side projection,
the medium support portion has a right-side contact portion that comes into contact with the right-side projection and a left-side contact portion that comes into contact with the left-side projection,
the right-side contact portion has
a first right-side engaged portion that is engaged with the right-side projection when the first right-side extension portion is in the stored state, and
a second right-side engaged portion that is engaged with the right-side projection when the first right-side extension portion is in the extended state, and
the left-side contact portion has
a first left-side engaged portion that is engaged with the left-side projection when the first left-side extension portion is in the stored state, and
a second left-side engaged portion that is engaged with the left-side projection when the first left-side extension portion is in the extended state.

4. The medium support device according to claim 3, wherein
the right-side engagement portion is located between the right-side first end portion and the right-side second end portion of the first right-side extension portion, and
the left-side engagement portion is located between the left-side first end portion and the left-side second end portion of the first left-side extension portion.

5. The medium support device according to claim 3, wherein
the right-side engagement portion is a right-side elastic deformation portion that is configured to be elastically deformed,
the left-side engagement portion is a left-side elastic deformation portion that is configured to be elastically deformed,
the right-side contact portion has a right-side wall portion,
the right-side elastic deformation portion is elastically deformed toward the rotation fulcrum of the first right-side extension portion when the right-side projection comes into contact with the right-side wall portion and moves to be engaged with the first right-side engaged portion or the second right-side engaged portion,
the left-side contact portion has a left-side wall portion, and
the left-side elastic deformation portion is elastically deformed toward the rotation fulcrum of the first left-side extension portion when the left-side projection comes into contact with the left-side wall portion and moves to be engaged with the first left-side engaged portion or the second left-side engaged portion.

6. The medium support device according to claim 1, further comprising:
a first link mechanism that couples the first right-side extension portion to the second left-side extension portion; and
a second link mechanism that couples the first left-side extension portion to the second right-side extension portion, wherein
the interlocking is performed by the first link mechanism and the second link mechanism.

7. The medium support device according to claim 6, wherein
the first link mechanism and the second link mechanism are located between the right-side first end portion and the right-side second end portion of the first right-side extension portion, and are located between the left-side first end portion and the left-side second end portion of the first left-side extension portion when the first extension portion is in the stored state.

8. The medium support device according to claim 1, wherein
a side surface that forms the right-side second end portion of the first right-side extension portion and a side surface that forms the left-side first end portion of the first left-side extension portion have first areas from base ends that are in contact, and second areas that are not in contact in the extended state, and
the non-contact second areas are separated in a direction in which the side surfaces are mutually separated toward tips.

9. The medium support device according to claim 1, wherein
the second extension portion has a handle portion that is engaged with the medium support portion in the stored state.

10. The medium support device according to claim 9, wherein
a part of the handle portion projects from the medium support portion in a width direction intersecting the transport direction and the depth direction.

11. The medium support device according to claim 1, wherein
the first extension portion has a regulating portion that is engaged with the medium support portion in the stored state.

12. The medium support device according to claim 11, wherein
the regulating portion projects toward a surface of a medium that is mounted when the first extension portion is in the extended state.

13. The medium support device according to claim 11, wherein
the second extension portion has a handle portion that is engaged with the medium support portion in the stored state, and
the handle portion overlaps with at least a part of the regulating portion when viewed in the depth direction in the stored state.

14. The medium support device according to claim 1, wherein
the medium support portion
is configured to open and close, by pivoting, a transport entrance through which the medium is transported,
is configured to support the medium in the open state, and
has an orientation along the depth direction in the closed state, and
the first extension portion entirely overlaps with the medium support portion in plan view in a state in which the first extension portion is stored in the medium support portion in the closed state.

15. A reading device comprising:
a reading unit that reads an image of a medium; and
a medium support device including a medium support portion that has a medium support surface on which the medium is supported such that the medium is configured to be transported in a transport direction toward the reading unit, and an extension support portion that is provided in the medium support portion, wherein
the medium support device is the medium support device according to claim 1.

16. A medium support device comprising:
a medium support portion that has a medium support surface on which a medium is supported such that the medium is configured to be transported in a transport direction; and
an extension support portion that is provided in the medium support portion, wherein
the extension support portion has
a first extension portion that is configured to be displaced between a stored state in which the first extension portion is stored in the medium support portion and an extended state in which the first extension portion is rotated with respect to the medium support portion to be extended and supports the medium together with the medium support portion, and
a second extension portion that is configured to be displaced between a stored state in which the second extension portion is stored in the first extension portion and an extended state in which the second extension portion is slid from the first extension portion in a first direction to be extended and supports the medium together with the first extension portion, the second extension portion being configured to be displaced, interlocking with rotation and displacement of the first extension portion, the first extension portion has a first right-side extension portion that is located further on a right side than a center position of the medium support portion, and a first left-side extension portion that is located further on a left side than the center position when viewed from a front side in a depth direction intersecting the transport direction, the second extension portion has a second right-side extension portion that is stored in the first right-side extension portion and a second left-side extension portion that is stored in the first left-side extension portion, the second right-side extension portion entirely overlaps with the first right-side extension portion in the stored state when viewed in the depth direction, the second left-side extension portion entirely overlaps with the first left-side extension portion when viewed in the depth direction in the stored state, the medium support portion is configured to open and close, by pivoting, a transport entrance through which the medium is transported, is configured to support the medium in the open state, and has an orientation along the depth direction in the closed state, and the first extension portion entirely overlaps with the medium support portion in plan view in a state in which the first extension portion is stored in the medium support portion in the closed state.

17. A reading device comprising:

a reading unit that reads an image of a medium; and a medium support device including a medium support portion that has a medium support surface on which the medium is supported such that the medium is configured to be transported in a transport direction toward the reading unit, and an extension support portion that is provided in the medium support portion, wherein the medium support device is the medium support device according to claim 16.

18. A medium support device comprising:

a medium support portion that has a medium support surface on which a medium is supported such that the medium is configured to be transported in a transport direction; and an extension support portion that is provided in the medium support portion, wherein the extension support portion has a first extension portion that is configured to be displaced between a stored state in which the first extension portion is stored in the medium support portion and an extended state in which the first extension portion is rotated with respect to the medium support portion to be extended and supports the medium together with the medium support portion, and a second extension portion that is configured to be displaced between a stored state in which the second extension portion is stored in the first extension portion and an extended state in which the second extension portion is slid from the first extension portion in a first direction to be extended and supports the medium together with the first extension portion, the first extension portion has a first right-side extension portion that is located further on a right side than a center position of the medium support portion, and a first left-side extension portion that is located further on a left side than the center position when viewed from a front side in a depth direction intersecting the transport direction, a right-side gear that is located at a base end of the first right-side extension portion and forms a right-side rotation fulcrum of the first right-side extension portion, and a left-side gear that is located at a base end of the first left-side extension portion, forms a left-side rotation fulcrum of the first left-side extension portion, and is engaged with the right-side gear, the first right-side extension portion includes, in a second direction intersecting the first direction, a right-side first end portion and a right-side second end portion facing the right-side first end portion, the first left-side extension portion includes, in the second direction, a left-side first end portion and a left-side second end portion facing the left-side first end portion, a side surface that forms the right-side second end portion of the first right-side extension portion and a side surface that forms the left-side first end portion of the first left-side extension portion have a partial range from base ends that are in contact, the right-side gear is provided to be located between the right-side first end portion and the right-side second end portion of the first right-side extension portion, the left-side gear is provided to be located between the left-side first end portion and the left-side second end portion of the first left-side extension portion, the second extension portion has a second right-side extension portion that is stored in the first right-side extension portion and a second left-side extension portion that is stored in the first left-side extension portion, the second right-side extension portion entirely overlaps with the first right-side extension portion in the stored state when viewed in the depth direction, and the second left-side extension portion entirely overlaps with the first left-side extension portion when viewed in the depth direction in the stored state.

\* \* \* \* \*